United States Patent
Ajmera et al.

(10) Patent No.: US 10,977,563 B2
(45) Date of Patent: Apr. 13, 2021

(54) PREDICTIVE CUSTOMER SERVICE ENVIRONMENT

(71) Applicant: [24]7.ai, Inc., San Jose, CA (US)

(72) Inventors: Dinesh Ajmera, Bangalore (IN); Debashish Panda, Bangalore (IN); Pankaj Ghanshani, Delhi (IN); Sumit Kumar, Bangalore (IN); Ravi Vijayaraghavan, Bangalore (IN); Mathangi Sri Ramachandran, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 1300 days.

(21) Appl. No.: 13/926,988

(22) Filed: Jun. 25, 2013

(65) Prior Publication Data
US 2014/0012626 A1 Jan. 9, 2014

Related U.S. Application Data

(62) Division of application No. 13/239,195, filed on Sep. 21, 2011, now abandoned.
(Continued)

(51) Int. Cl.
*G06N 20/00* (2019.01)
*H04L 12/58* (2006.01)
(Continued)

(52) U.S. Cl.
CPC ............. *G06N 5/04* (2013.01); *G06N 3/006* (2013.01); *G06N 20/00* (2019.01); *G06Q 10/10* (2013.01);
(Continued)

(58) Field of Classification Search
CPC ...... G06Q 10/00; G06Q 10/10; G06Q 30/016; G06Q 30/0202; G06N 5/04; G06N 20/00;
(Continued)

(56) References Cited

U.S. PATENT DOCUMENTS

| | | |
|---|---|---|
| 6,587,556 B1 | 7/2003 | Judkins et al. |
| 7,039,166 B1 * | 5/2006 | Peterson ............... H04M 3/493 379/265.03 |

(Continued)

FOREIGN PATENT DOCUMENTS

| | | |
|---|---|---|
| CN | 101190941 A | 6/2008 |
| WO | 9407918 A1 | 4/1994 |
| WO | 2000073955 | 12/2000 |

OTHER PUBLICATIONS

Bar-Hillel, et al., "Learning a Mahalanobis Metric from Equivalence Constraints", Journal of Machine Learning Research, Apr. 2005, pp. 1-29.
(Continued)

*Primary Examiner* — Sangeeta Bahl
(74) *Attorney, Agent, or Firm* — Perkins Coie LLP; Michael Glenn

(57) ABSTRACT

A mechanism for facilitating customer interactions within a customer service environment provides prompt and accurate answers to customer questions. A smart chat facility for use in a customer service environment to predict a customer problem examines a customer chat transcript to identify customer statements that set forth a customer issue and, responsive to this, can route the customer to an agent, an appropriate FAQ, or can implement a problem specific widget in the customer UI. Customer queries are matched with most correct responses and accumulated knowledge is used to predict a best response to future customer queries. The iterative system thus learns from each customer interaction and can adapt to customer responses over time to improve the accuracy of problem prediction.

14 Claims, 27 Drawing Sheets

Related U.S. Application Data

(60) Provisional application No. 61/385,866, filed on Sep. 23, 2010.

(51) Int. Cl.
  *G06Q 10/10* (2012.01)
  *H04L 12/18* (2006.01)
  *G06Q 30/02* (2012.01)
  *G06N 3/00* (2006.01)
  *G06Q 30/00* (2012.01)
  *G06N 5/04* (2006.01)
  *H04M 3/51* (2006.01)

(52) U.S. Cl.
  CPC ....... *G06Q 30/016* (2013.01); *G06Q 30/0202* (2013.01); *H04L 12/1827* (2013.01); *H04L 51/02* (2013.01); *H04L 51/04* (2013.01); *H04M 3/5183* (2013.01)

(58) Field of Classification Search
  CPC ..... G06N 3/006; H04L 51/02; H04L 12/1827; H04L 51/04; H04M 3/5183
  USPC .................................................. 705/1.1, 304
  See application file for complete search history.

(56) References Cited

U.S. PATENT DOCUMENTS

| | | | |
|---|---|---|---|
| 7,600,017 B2 | 10/2009 | Holtzman et al. | |
| 7,631,007 B2 | 12/2009 | Morris | |
| 7,673,340 B1* | 3/2010 | Cohen | G06F 11/3438 379/266.08 |
| 8,140,703 B2 | 3/2012 | Morris et al. | |
| 8,238,541 B1* | 8/2012 | Kalavar | H04M 3/5233 379/265.06 |
| 8,296,373 B2 | 10/2012 | Bosworth et al. | |
| 8,370,155 B2* | 2/2013 | Byrd | G06Q 10/10 379/88.01 |
| 8,488,774 B2* | 7/2013 | Mahalaha | H04M 3/5233 379/265.13 |
| 8,533,208 B2 | 9/2013 | Sundaresan et al. | |
| 9,021,361 B1 | 4/2015 | Pettinati et al. | |
| 2002/0062368 A1 | 5/2002 | Holtzman et al. | |
| 2004/0236832 A1 | 11/2004 | Morris et al. | |
| 2006/0242140 A1 | 10/2006 | Wnek | |
| 2008/0065471 A1 | 3/2008 | Reynolds et al. | |
| 2008/0077572 A1 | 3/2008 | Boyle et al. | |
| 2008/0167952 A1 | 7/2008 | Blair et al. | |
| 2008/0189380 A1 | 8/2008 | Bosworth et al. | |
| 2008/0249764 A1 | 10/2008 | Huang et al. | |
| 2009/0012826 A1 | 1/2009 | Eilam et al. | |
| 2009/0119281 A1 | 5/2009 | Wang et al. | |
| 2009/0222313 A1 | 9/2009 | Kannan et al. | |
| 2009/0228264 A1* | 9/2009 | Williams | G10L 13/027 704/9 |
| 2009/0249279 A1 | 10/2009 | Bourdon | |
| 2010/0002863 A1 | 1/2010 | Loftus et al. | |
| 2010/0005268 A1 | 1/2010 | Yang et al. | |
| 2010/0049679 A1* | 2/2010 | Phillips | G06Q 30/02 706/15 |
| 2010/0104087 A1 | 4/2010 | Byrd et al. | |
| 2010/0119053 A1 | 5/2010 | Goeld | |
| 2010/0138282 A1 | 6/2010 | Kannan et al. | |
| 2010/0191658 A1 | 7/2010 | Kannan et al. | |
| 2010/0257117 A1 | 10/2010 | Shvadron et al. | |
| 2010/0275128 A1 | 10/2010 | Ward et al. | |
| 2010/0325107 A1 | 12/2010 | Kenton et al. | |
| 2010/0332287 A1 | 12/2010 | Gates et al. | |
| 2011/0276513 A1 | 11/2011 | Erhart et al. | |
| 2012/0076283 A1 | 3/2012 | Ajmera et al. | |
| 2012/0095770 A1 | 4/2012 | Jacob Sushil et al. | |
| 2012/0130771 A1 | 5/2012 | Kannan et al. | |
| 2012/0259919 A1 | 10/2012 | Yan et al. | |
| 2013/0166457 A1 | 6/2013 | Du et al. | |
| 2014/0181699 A1 | 6/2014 | Godsey et al. | |

OTHER PUBLICATIONS

Basu, et al., "A Probabilistic Framework for Semi-Supervised Clustering", Proc. of the Tenth ACM SIGKDD Int'l Conference on Knowledge Discovery and Data Mining, Seattle, WA, Aug. 2004, pp. 59-68.

Basu, et al., "Active Semi-Supervision for Pairwise Constrained Clustering", Proc. of the SIAM Int'l Conference on Data Mining, Lake Buena Vista, FL, Apr. 2004, pp. 333-344.

Basu, et al., "Semi-supervised Clustering by Seeding", Proc. of the 19th Int'l Conference on Machine Learning, Sydney, Australia, Jul. 2002, pp. 19-26.

Bilenko, et al., "Integrating Constraints and Metric Learning in Semi-Supervised Clustering", Proc. of the 21st Int'l Conference on Machine Learning, Banff, Canada, Jul. 2004, pp. 81-88.

Chuang, et al., "Emotion Recognition From Textual Input Using an Emotional Semantic Network", ICSLP 2002, Denver, Sep. 2002, pp. 2033-2036.

Chuang, et al., "Enriching Web Taxonomies through Subject Categorization of Query Terms from Search Engine Logs", Decision Support Systems, vol. No. 1, Apr. 2003, 18 pages.

Cover, T.M., "Nearest Neighbor Pattern Classification", IEEE Transactions on Information Theory, vol. IT-13, No. 1, Jan. 1997, pp. 21-27.

Cowie, et al., "Describing the emotional states that are expressed in speech", Speech Communication Special Issue on Speech and Emotion, Jun. 2002, 28 pages.

Cutting, et al., "Scatter/Gather: A Cluster-based Approach to Browsing Large Document Collections", ACM 15th Annual Int'l SIGIR '92, Jun. 1992, 12 pages.

Domingos, et al., "On the Optimality of the Simple Bayesian Classifier under Zero-One Loss", Kluwer Academic Publishers, Boston., Nov. 1997, 30 pages.

Friedman, N. et al., "Bayesian Network Classifiers", Machine Learning, vol. 29, Nov. 1997, pp. 131-163.

Griffin, et al., "The Voice of the Customer", Marketing Science, vol. 12, No. 1, Winter 1993, 27 pages.

Haichao, et al., "Structural Analysis of Chat Messages for Topic Detection", Online Information Review, vol. 30, No. 5, Sep. 2006, 33 pages.

Jain, et al., "Data Clustering: A Review", ACM Computing Surveys, Sep. 1999, pp. 264-323.

Johnson, S.C., "Hierarchical Clustering Schemes", Psychometrika, vol. 32, No. 3, Sep. 1967, pp. 2741-254.

Kose, et al., "A Comparison of Textual Data Mining Methods for Sex Identification in Chat Conversations", LNCS 4993, Jan. 2008, pp. 938-643.

Langley, et al., "An Analysis of Bayesian Classifiers", Proceedings of the Tenth National Conference on Artificial Intelligence, Jul. 1992, pp. 223-228.

Liu, et al., "A Model of Textual Affect Sensing using Real-World Knowledge", ACM IUI '03, Miami, Florida, USA, Jan. 2003, 8 pages.

McQueen, , "Some methods for classification and analysis of multivariate observations", Proc. of Symposium on Mathematics, Statistics & Probability held Jun. 21-Jul. 18, 1965 and Dec. 27, 1965-Jan. 7, 1966, Berkeley, California, 1967, pp. 281-298.

Mehta, et al., "SLIQ: A Fast Scalable Classifier for Data Mining", Int'l Conference on Extending Database Technology, Mar. 1996, 15 pages.

Quinlan, J.R., "Induction of Decision Trees", Machine Learning 1, 1986, pp. 81-106.

Ruiz, et al., "Hierarchical Text Categorization Using Neural Networks", Kluwer Academic Publishers, Jan. 2002, 40 pages.

Sebastiani, F., "Machine Learning in Automated Text Categorization", ACM Computing Surveys, vol. 34, No. 1, Mar. 2002, pp. 1-47.

(56) References Cited

OTHER PUBLICATIONS

Steinbach, et al., "A Comparison of Document Clustering Techniques", In KDD Workshop on Text Mining, Boston, MA, Aug. 2000, 20 pages.

Tang, et al., "Bias Analysis in Text Classification for Highly Skewed Data", Fifth IEEE Int'l Conference on Data Mining, Nov. 2005, 8 pages.

Wagstaff, et al., "Constrained K-means Clustering with Background Knowledge", In Proceedings of the 18th Int'l Conference on Machine Learning, Jun. 2001, 8 pages.

Wetzker, et al., "Tailoring Taxonomies for Effieicent Text Categorization and Expert Finding", IEEE/WIC/ACM Int'l Conference on Web Intelligence and Intelligent Agent Technology, vol. 3, Dec. 2008, pp. 459-462.

Wong, et al., "Incremental Document Clustering for Web Page Classification", IEEE Int'l Conference on Information Society in the 21st Century: Emerging Technologies and New Challenges, Japan, Jul. 1, 2000, 21 pages.

Xiang, et al., "Learning a Mahalanobis distance metric for data clustering and classification", Pattern Recognition, vol. 41, Dec. 2008, pp. 3600-3612.

Xing, et al., "Distance metric learning, with application to clustering with side-information", Advances in Neural Information Processing Systems, vol. 15, Dec. 2003, pp. 505-512.

Yang, et al., "A re-examination of text categorization methods", Proceedings of the 22nd Annual Int'l ACM SIGIR Conference on Research and Development in Information Retrieval, Berkeley, CA, USA, Aug. 1999, pp. 42-49.

Zamir, et al., "Fast and Intuitive Clustering of Web Documents", American Association for Artificial Intelligence, KDD-97 Proceedings, Newport Beach, CA, Aug. 1997, pp. 287-290.

Zhang, H., "Exploring Conditions for the Optimatlity of Naive Bayes", Int'l Journal of Pattern Recognition and Artificial Intelligence, vol. 19, No. 2, World Scientific Publishing Co., Mar. 2005, pp. 183-198.

Zhao, et al., "Empirical and Theoretical Comparisons of Selected Criterion Functions for Document Clustering", Machine Learning, Kluwer Academic Publishers, Jun. 2004, pp. 311-331.

Zhao, et al., "Hierarchical Clustering Algorithms for Document Datasets", Data Mining and Knowledge Discovery, vol. 10, Mar. 2005, pp. 141-168.

Vijayasarathy, Leo R, "Predicting consumer intentions to user on-line shopping: the case for an augmented technology acceptance model", Information & Management 31 (2004) 747-762.

\* cited by examiner

PSP Reporting

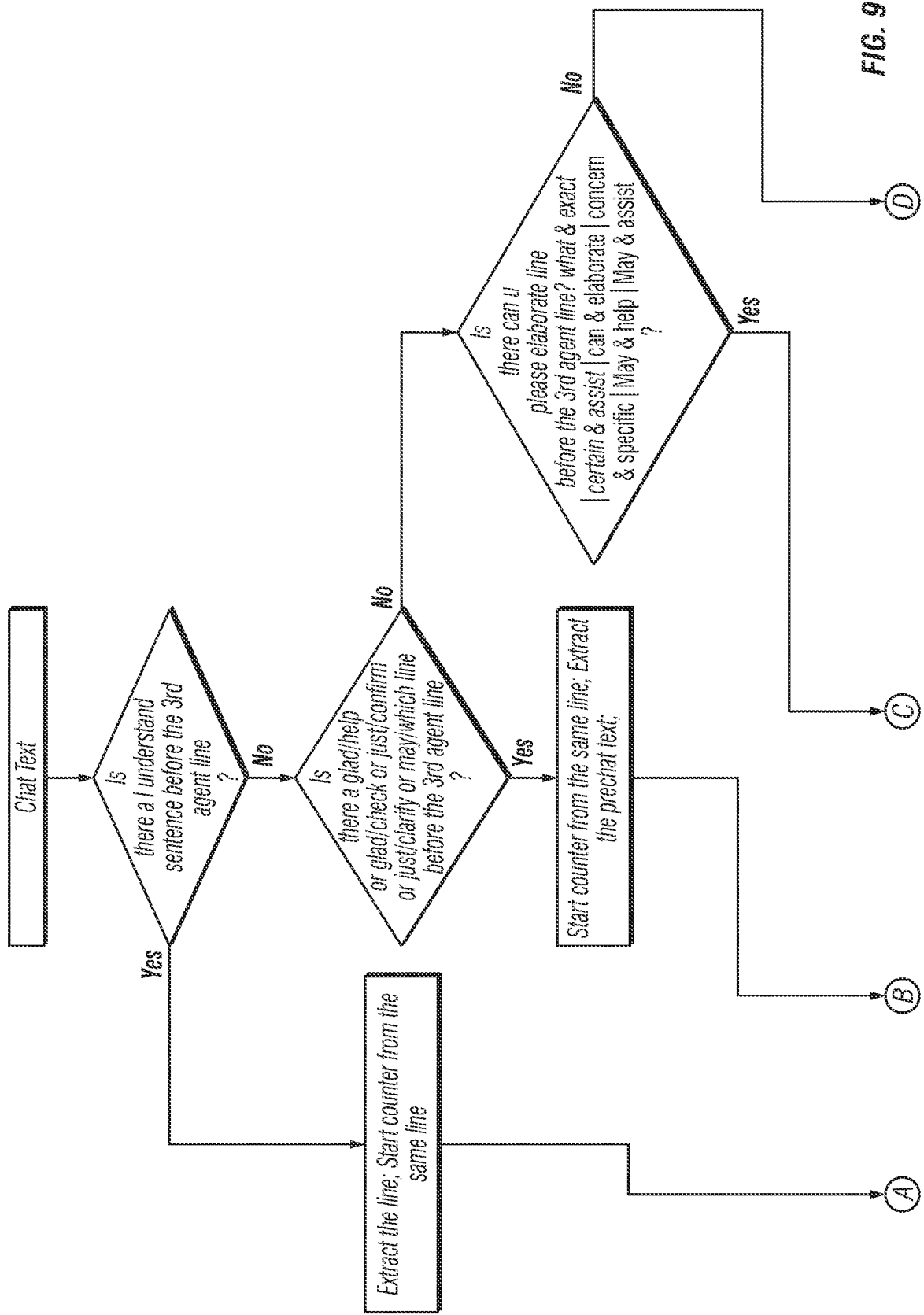

| Journey 1 | Journey 2 | Journey 3 | Source-Destination | Time before departure | Query Category |
|---|---|---|---|---|---|
| Select Seat | Check-In | | International | 3 hours | Seat Assignment |
| International | Check-In | My Itineraries | Domestic | 2 days | Itineraries Related |
| Baggage | Check-In | | International | | Baggage |

FIG. 14

PREDICTIVE CUSTOMER SERVICE ENVIRONMENT

CROSS REFERENCE TO RELATED APPLICATIONS

This application is a divisional application of U.S. patent application Ser. No. 13/239,195, filed Sep. 21, 2011, and claims priority to U.S. provisional patent application Ser. No. 61/385,866, filed Sep. 23, 2010, and each of which application is incorporated herein in its entirety by this reference thereto.

BACKGROUND OF THE INVENTION

Technical Field

The invention relates to customer/agent interaction. More particularly, the invention relates to problem prediction and context based resolution in a customer service environment.

Description of the Background Art

The customer experience has never been more important, informed by technological advancements such as Google Predictive Search, and the collective power of social media to influence consumer sentiment and behavior. Executive responsible for customer care face the challenge of meeting rising expectations without increasing costs.

Strong growth in the variety and utilization of connected devices—from PCs to smart phones and tablets—has made the online channel the one consumers love to use. It is an opportunity for companies to redefine and dramatically improve customer service and manage costs—if they can predict customer needs and address them quickly and courteously—the first time, every time.

For example, the quality of service provided to a customer directly affects the relationship between the customer and a merchant. Call centers and Web-based customer service facilities strive to provide prompt and helpful answers to customer questions, but often fail to do so. The process of getting an answer to a question can be both time-consuming and frustrating for a customer, as well as for the agent who is assisting the customer.

It would be advantageous to provide a mechanism for facilitating customer interactions within a customer service environment to provide prompt and accurate answers to customer questions.

SUMMARY OF THE INVENTION

An embodiment of the invention provides predictive experience solutions for online customer experiences. Unlike proactive chat and reactive web-self-service, an embodiment of the invention predicts not only who needs assistance, but when, where, why, and how. The invention also integrates self-service and chat in a compelling interface that guides customer journeys across multiple pages and queues, if necessary.

One embodiment of the invention provides a mechanism for facilitating customer interactions within a customer service environment to provide prompt and accurate answers to customer questions. In particular, this embodiment of the invention provides a smart chat facility for use in a customer service environment to predict a customer problem. For example, the invention examines a customer chat transcript to identify customer statements that set forth a customer issue and, responsive to this, can route the customer to an agent, an appropriate FAQ, or can implement a problem specific widget in the customer UI. The invention provides a facility that learns to match customer queries with most correct responses and then uses this accumulated knowledge to predict a best response to future customer queries. Because the invention provides an iterative system that learns from each customer interaction, the system can adapt to customer responses over time and improve the accuracy of problem prediction.

BRIEF DESCRIPTION OF THE DRAWINGS

FIG. 14 shows a sample progress table for a problem predictor according to the invention;

DETAILED DESCRIPTION OF THE INVENTION

An embodiment of the invention provides a prediction platform for customer service that analyzes Web behavior, customer data, call data, and individual journeys of Website visitors to help segment end-customers with a high propensity to call. It then eliminates the need for the call by providing a highly personalized and unique predictive chat or self serve interaction, thereby eliminating potential calls from the Website.

Figure 1:
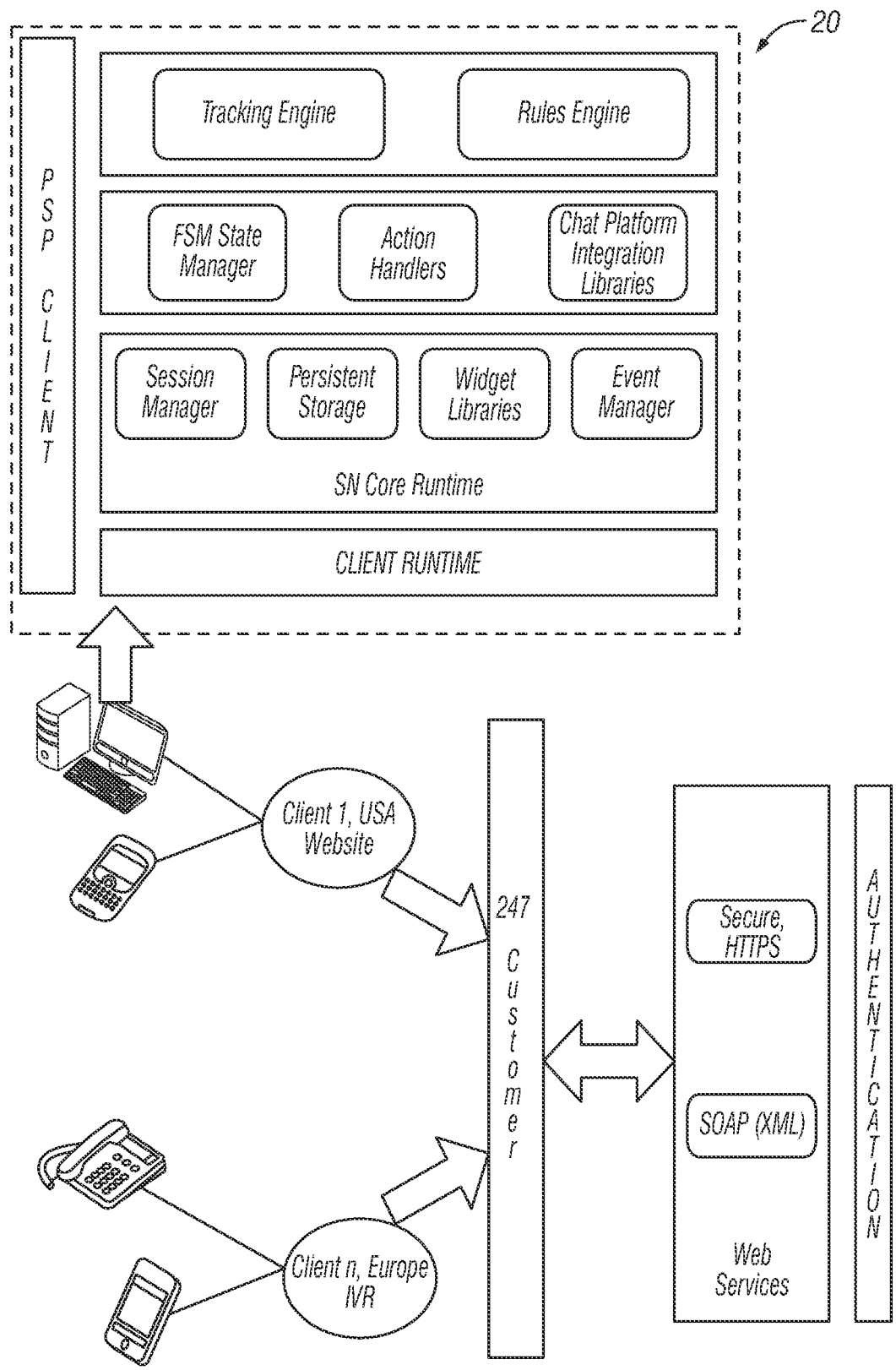
FIG. 1 is a block schematic diagram showing a prediction services platform architecture according to the invention.
Figure 1:
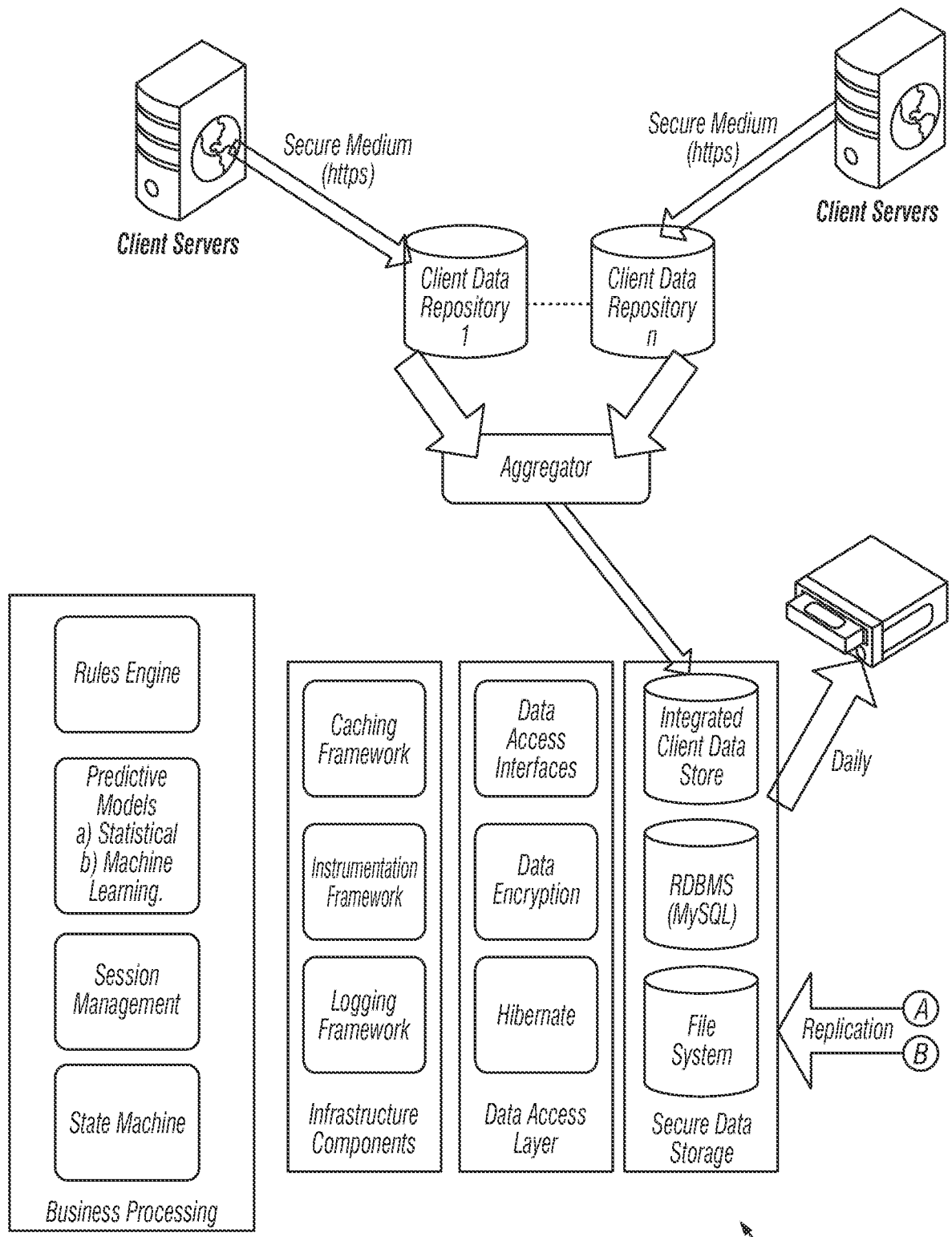
Figure 1:
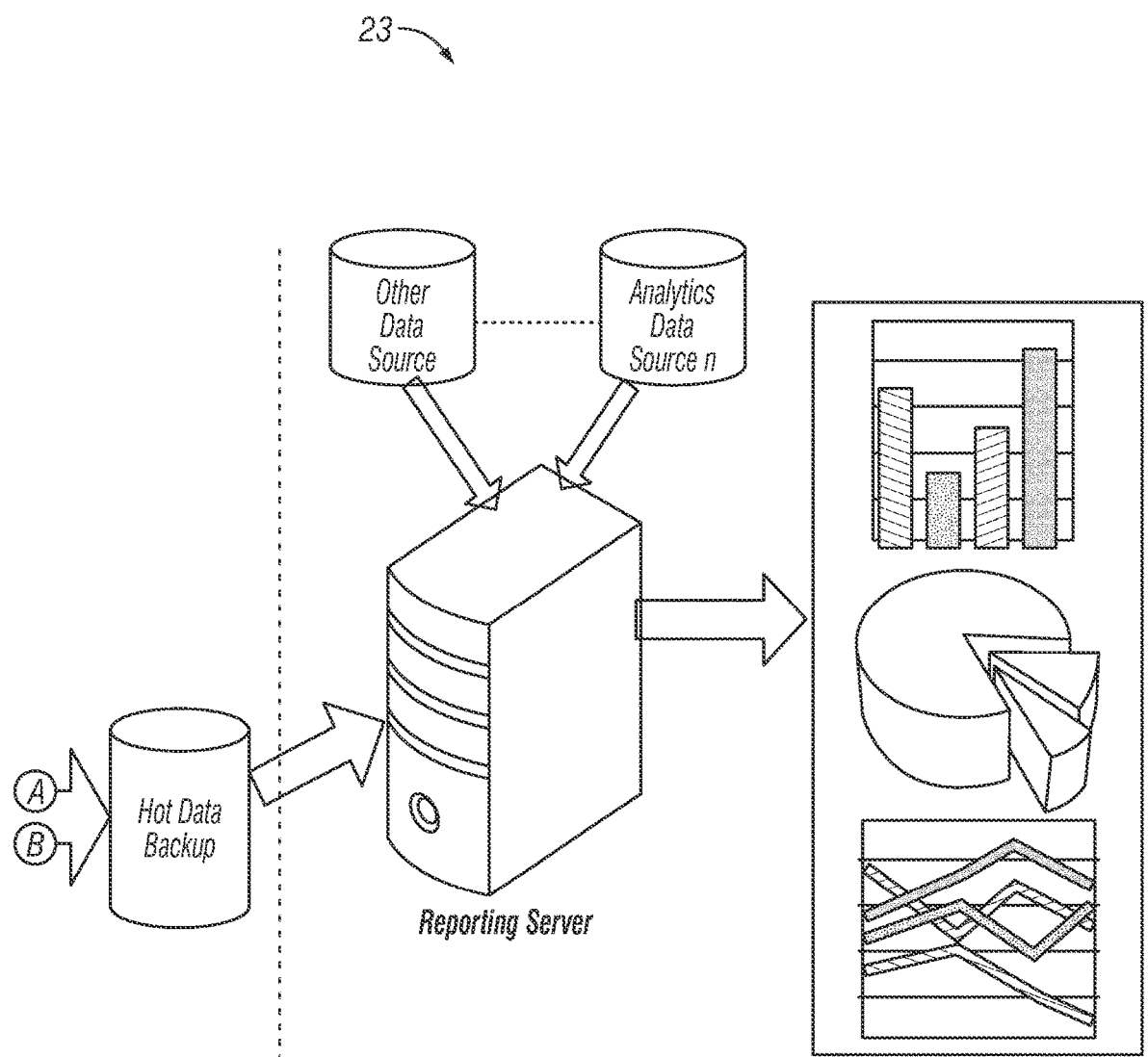

FIG. 1 is a block schematic diagram showing a prediction services platform architecture according to the invention. Broadly, the platform includes a client side element 21 that comprises one or more clients 20, a server side element 22, and a reporting element 23.

Figure 2:
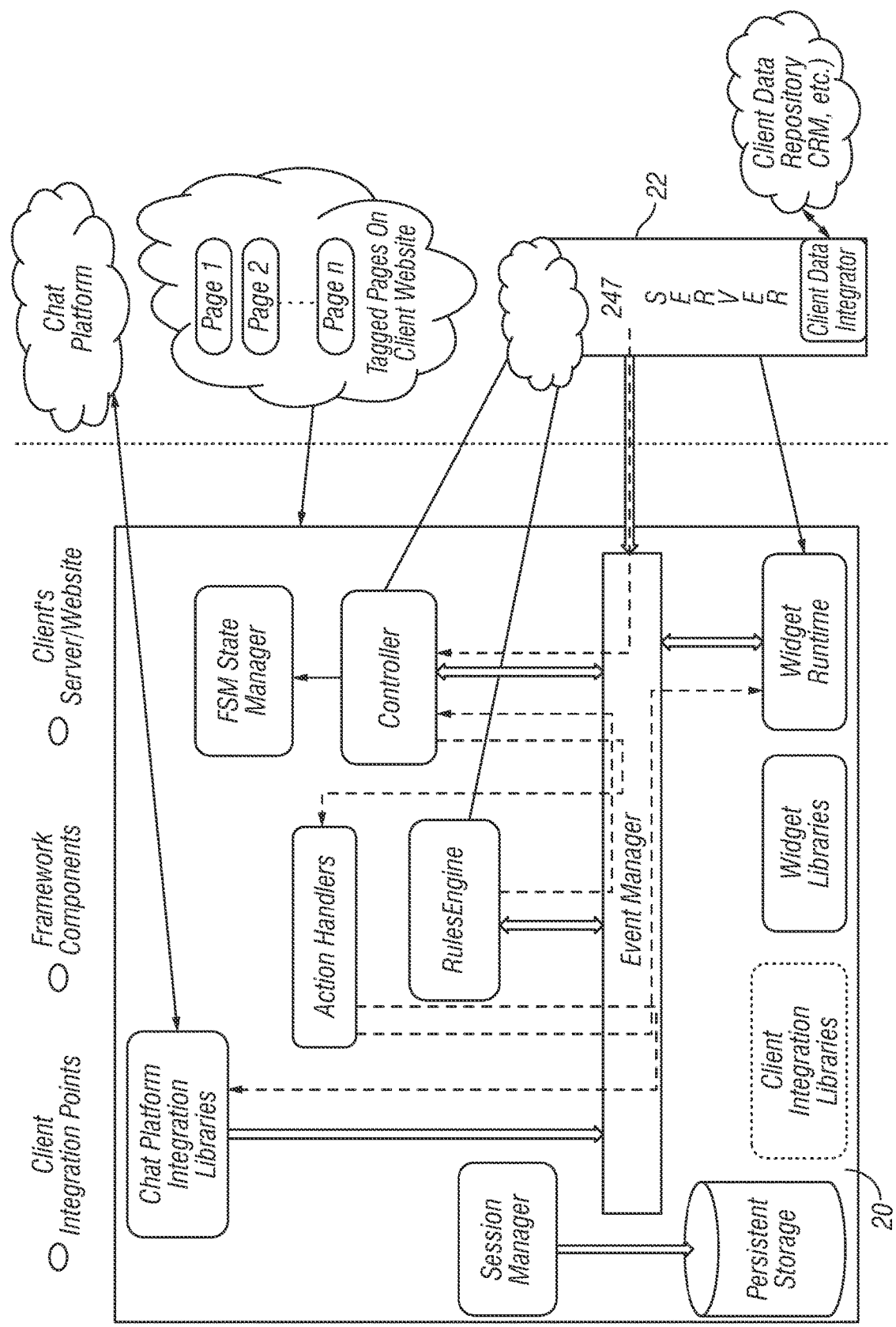
FIG. 2 is a block schematic diagram showing prediction services platform client integration according to the invention.

FIG. 2 is a block schematic diagram showing prediction services platform client integration according to the invention. Client integration points are shown within the client 20 and include specifically the action handlers and event manager. Within the server 22, client integration points include the client data integrator. The client's server/Website includes pages 1-n, the client integration libraries, and the client data repository. The framework components include the chat platform integration libraries, session manager, persistent storage, rules engine, FSM state manager, controller, widget libraries, widget runtime and server 22.

Another embodiment of the invention provides a mechanism for facilitating customer interactions within a customer service environment to provide prompt and accurate answers to customer questions. In particular, the invention provides a smart chat facility for use in a customer service environment to predict a customer problem. For example, the invention examines a customer chat transcript to identify customer statements that set forth a customer issue and, responsive to this, can route the customer to an agent, an appropriate FAQ, or can implement a problem specific widget in the customer UI. The invention provides a facility that learns to match customer queries with most correct responses and then uses this accumulated knowledge to predict a best response to future customer queries. Because the invention provides an iterative system that learns from each customer interaction, the system can adapt to customer responses over time and improve the accuracy of problem prediction.

Predictive Service Platform

One embodiment of the invention provides a predictive service platform that models a user's Web journey. A finite state machine is implemented consisting of different states and transitions between the states.

Figure 3:
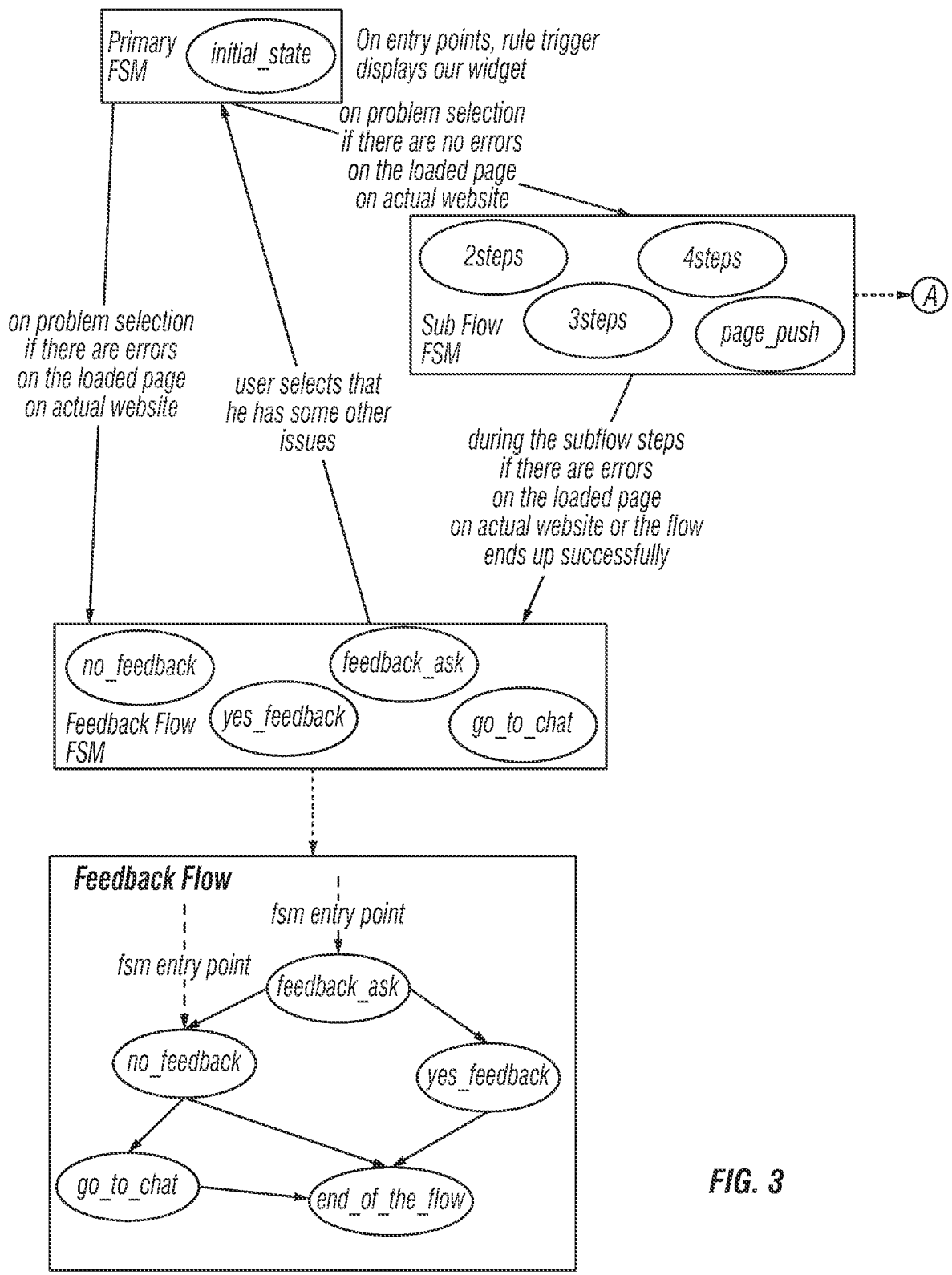
FIG. 3 is a block schematic diagram that shows high level state flow, including variable and transitions according to the invention.
Figure 3:
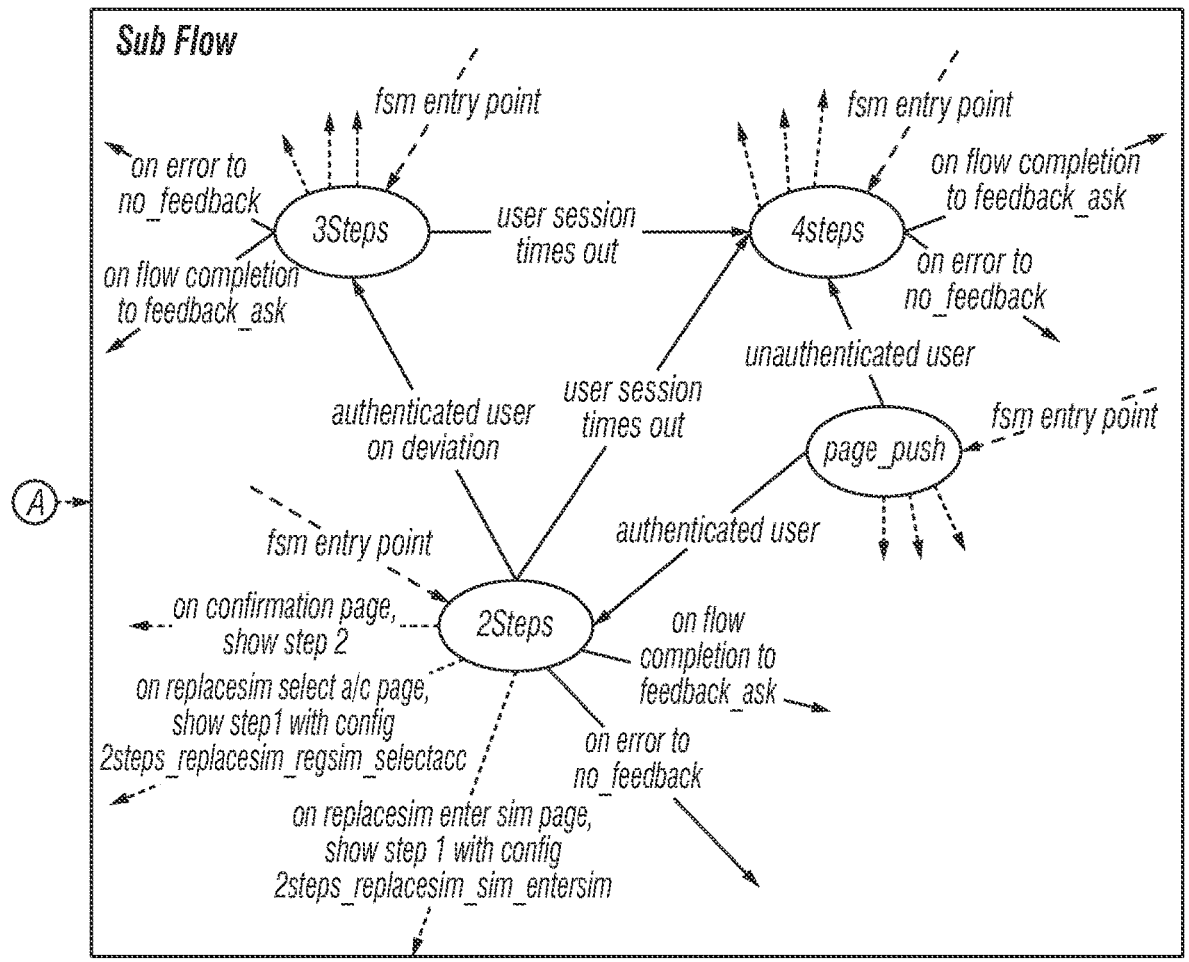

FIG. 3 is a block schematic diagram that shows high level state flow, including variable and transitions according to the invention. FIG. 3 includes a primary FSM, a sub flow FSM and a sub flow, and a feedback flow FSM and a feedback flow.

The predictive service platform provides real time interaction solutions in conjunction with a Website, where the predictive service platform is integrated to the Website, for example, via java scripting. An embodiment provides an event driven customizable action execution mechanism to facilitate contextual interactions, and also provides a generic session management and information tracking mechanism to capture a user's Web journey.

Figure 4:
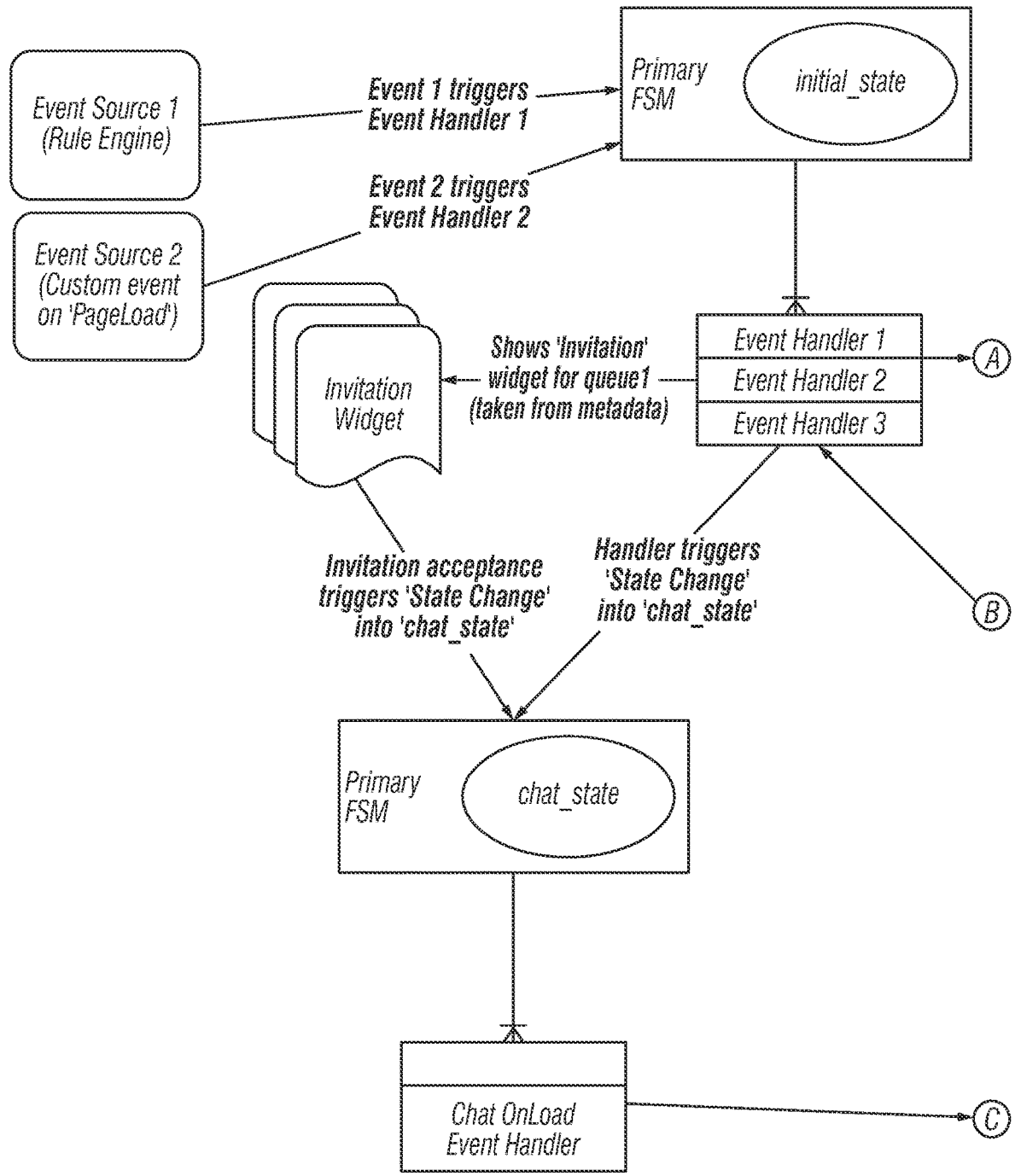
FIG. 4 is a block schematic diagram that shows how event handlers trigger actions or state changes, or present widgets to engage with the customer according to the invention.
Figure 4:
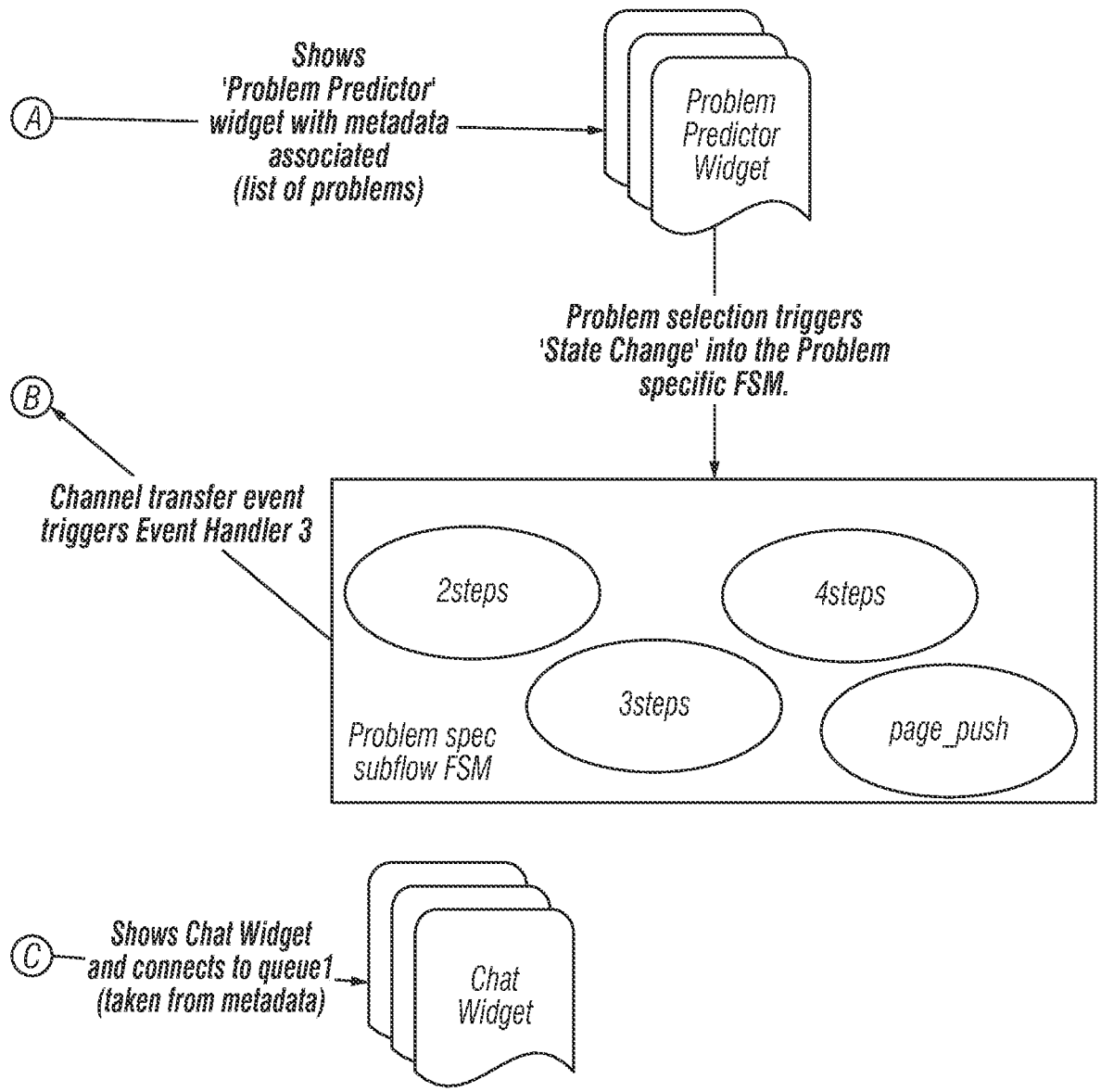

FIG. 4 is a block schematic diagram that shows how event handlers trigger actions or state changes, or present widgets to engage with the customer according to the invention.

The predictive service platform captures the context, i.e. data and actions, of the visitor journey through the site and takes contextual decisions by use of sophisticated analytical models that focus on how to engage the visitor.

Figure 5:
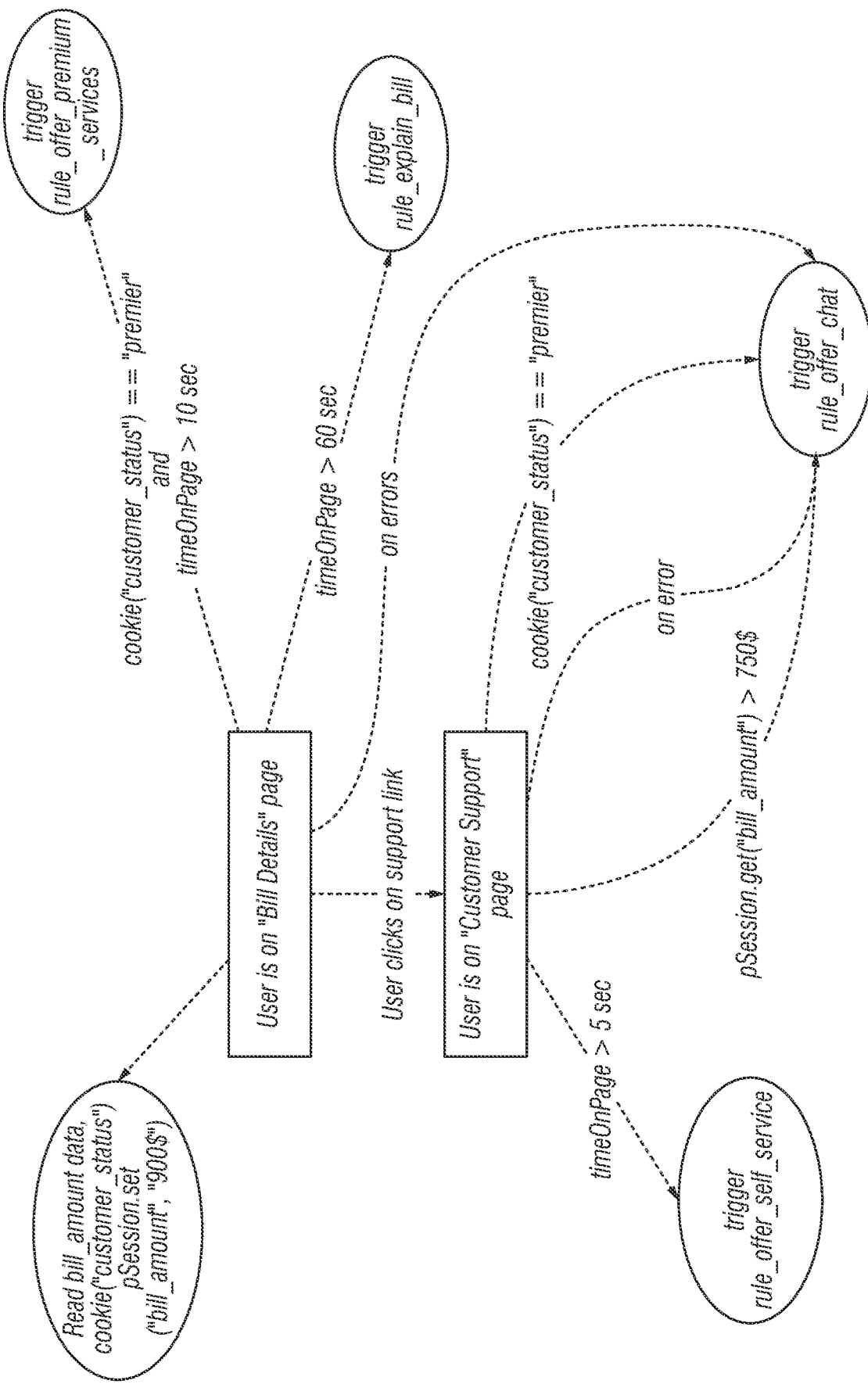
FIG. 5 is a block schematic diagram that shows data and actions in connection with a customer Web journey according to the invention.

FIG. 5 is a block schematic diagram that shows data and actions in connection with a customer Web journey according to the invention. Such data and actions can pertain to any of the following broad categories:

Whom to engage: based on the context, especially collected data elements of the visitor including, but not limited to, customer/visitor's prior history of interactions, Web journey, and Web behavior;

When and where to engage: based on the context, especially the journey of the user, time spent on the journey, etc.; and What to show: based on the context, especially according to the targeted way to engage the customer.

Example Embodiments of the Predictive Service Platform

Key solutions offered on the predictive service platform for the Web medium primarily can be categorized into the following example categories:

Sales solutions, which:

Identify and engage buyers to increase sales via a rules engine driven chat interaction;

Provide a proactive and reactive way to engage customers via invitations and contextual content presentation that let the user initiate a chat reactively; and Increase conversion via customized actions and content, including multi-media content, e.g. video, audio and chat enabled sales that show targeted promotions, cross sell, and up sell.

Service solutions, which:

Increase self-serve resolution rates through targeted self service for specific problems, where a problem predictor is used to identify the right issues of the user and guided resolution paths are provided to help the user go though an assisted journey in the main Website to solve a problem; and Improve customer loyalty and satisfaction via contextual and targeted content and actions and targeted problem prediction and resolutions.

The predictive service platform thus provides a novel approach for building and provisioning real time interaction management solutions over the Web, which captures the user's journey, e.g. data, actions, and time on all pages, and models the same as a finite state machine consisting of distinct states and conditional transitions between them. In an embodiment, a page load results into a state transition, any event can cause a state transition, and all metadata for action invocation is attached to a state.

An embodiment provides an event-driven, customizable action execution mechanism to facilitate contextual interactions, in which: any event can trigger an action to be taken, different event handlers are allowed to be configured to take specific actions; an event handler can cause the state transition; an event handler shows up an interaction popup; a self service wizard, or any other customized interaction interface to the user; an event handler can initiate a chat conversation at any point in time; issues and resolutions can be predicted based on predictive models; and multiple mediums of interaction can be employed during an interaction, e.g. chat, self service, emails, click to call, etc.

An embodiment also provides a generic session management and information tracking mechanism to capture user's journey, in which sessions can be generated to identify a visitor, a logical browsing session of the user, as well as a logical interaction with the user and periodical and on-demand update of tracked information can be sent to the server.

The invention takes advantage of the persistent local storage on the browser to keep track of all the information throughout the user's journey, thereby making the server stateless. Accordingly, information can be shared across multiple windows, all contextual information is captured and can be sent across in any of the client-server interactions, the server is completely stateless, thereby providing maximum scalability and availability, and different storage options can be used in the browser, e.g. Flash cookie, local storage, cookies. etc.

Smart Chat

Figure 6:
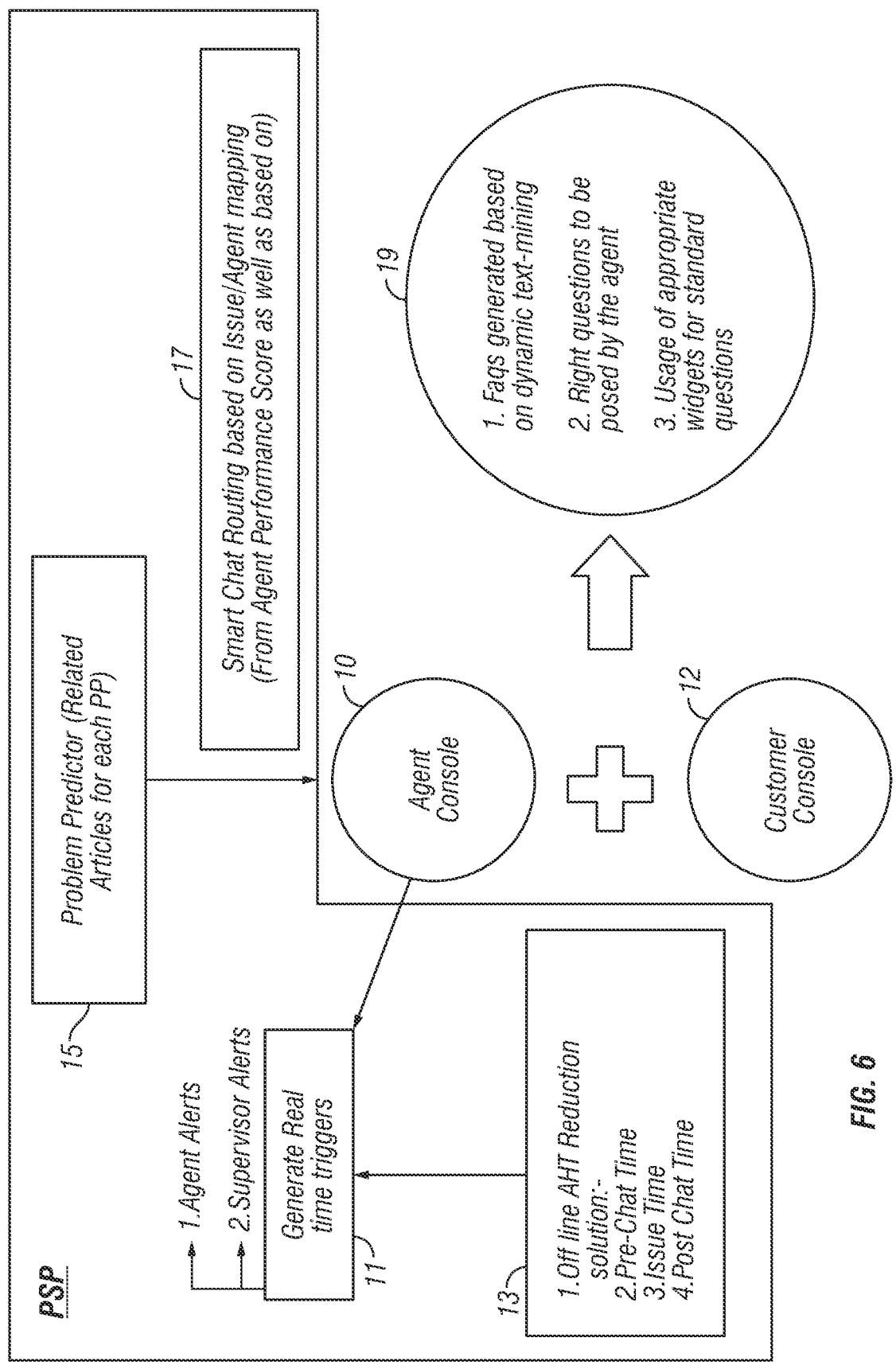
FIG. 6 is a block schematic diagram showing an architecture for a smart chat client for problem prediction in a customer service environment according to the invention.

FIG. 6 is a block schematic diagram showing an architecture for a smart chat facility for problem prediction in a customer service environment according to the invention. In FIG. 6, an agent console 10 interacts with a problem predictor 15. In a presently preferred embodiment, a plurality of problems are predicted, where each problem prediction has related articles which provide resolution for each of the predicted problems with which a customer interacts.

Figure 7:
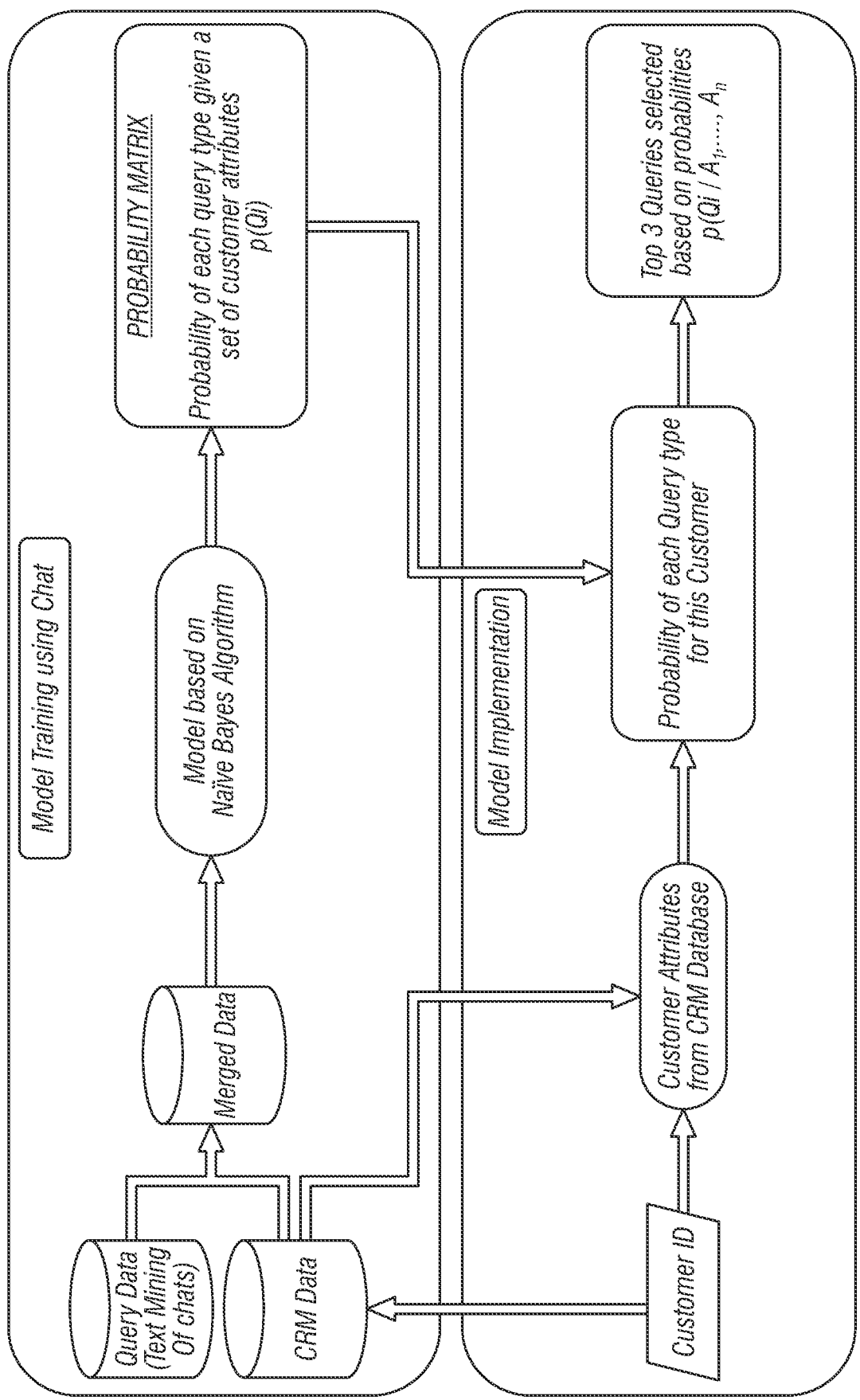
FIG. 7 is a block schematic diagram that shows a problem predictor in which chat is used to bootstrap guided self-service according to the invention.

FIG. 7 is a block schematic diagram that shows a problem predictor in which chat is used to bootstrap guided self-service according to the invention.

Figure 8:
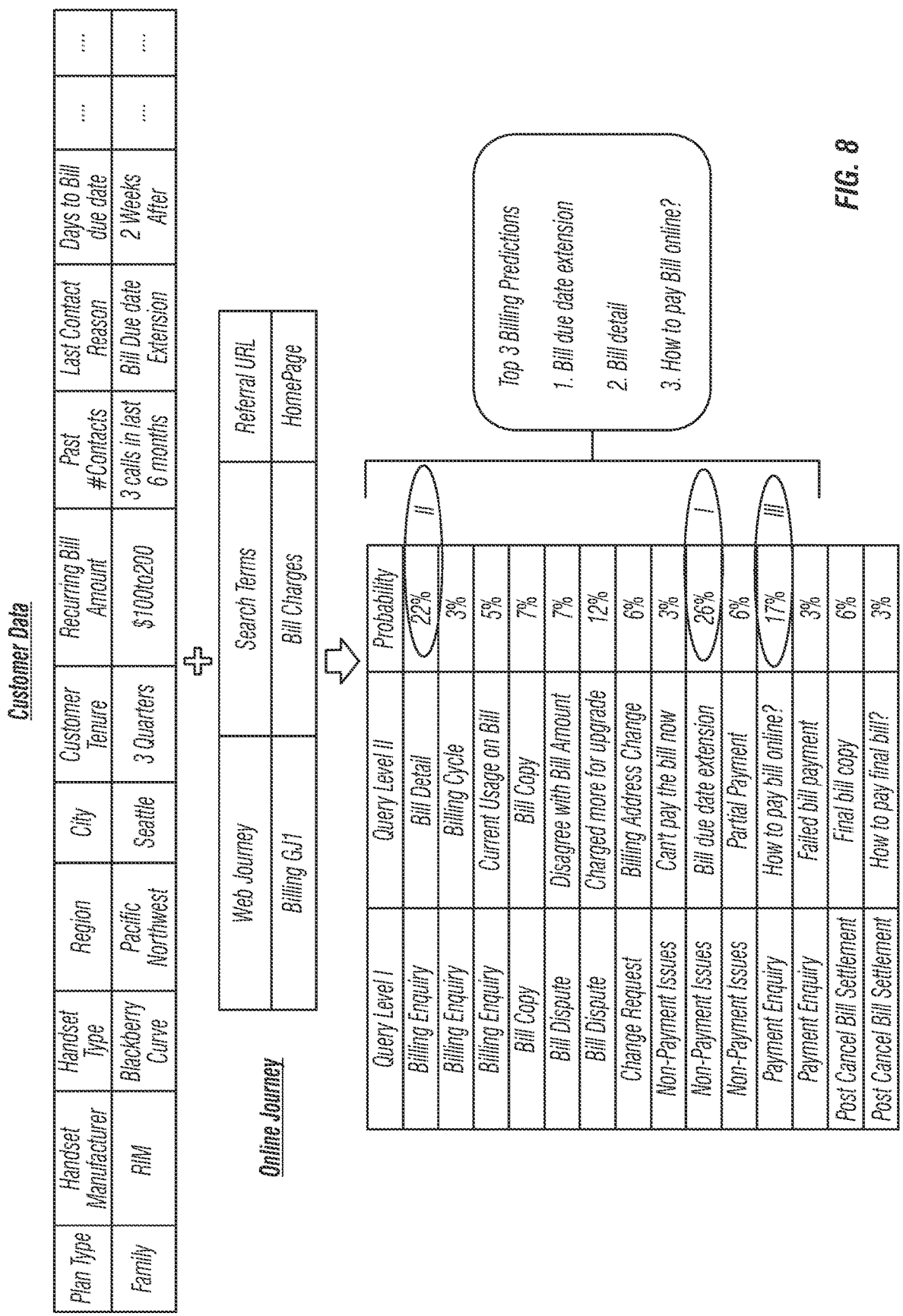
FIG. 8 is a flow diagram that provides an example of the use of issue prediction to trigger an appropriate guided self-service widget according to the invention.

FIG. 8 is a flow diagram that provides an example of the use of issue prediction to trigger an appropriate guided self-service widget according to the invention.

A feature of the invention provides a smart chat routing module 17 (FIG. 6) with which customer chat is routed to service center agents based upon an issue/agent mapping, as well as an agent performance score. With regard to the agent performance score, see U.S. patent application Ser. No. 13/161,291, filed Jun. 15, 2011, which application is incorporated herein in its entirety by this reference thereto.

The agent console operates in coordination with a module that generates real time triggers 11, such as agent alerts and supervisor alerts. These alerts are based on such factors as, for example, if the agent is not doing what they are supposed to, e.g. they could be taking too long to respond (discussed below); or they could be taking more time than normal for any one stage of the chat (discussed below); or they could be responding to the wrong issue, as determined based on the issue identification model. These triggers are based upon inputs 13 that include, for example, an off line average hold time (AHT) reduction solution and values for customer pre-chat time, issue time, and post-chat time.

Figure 9:
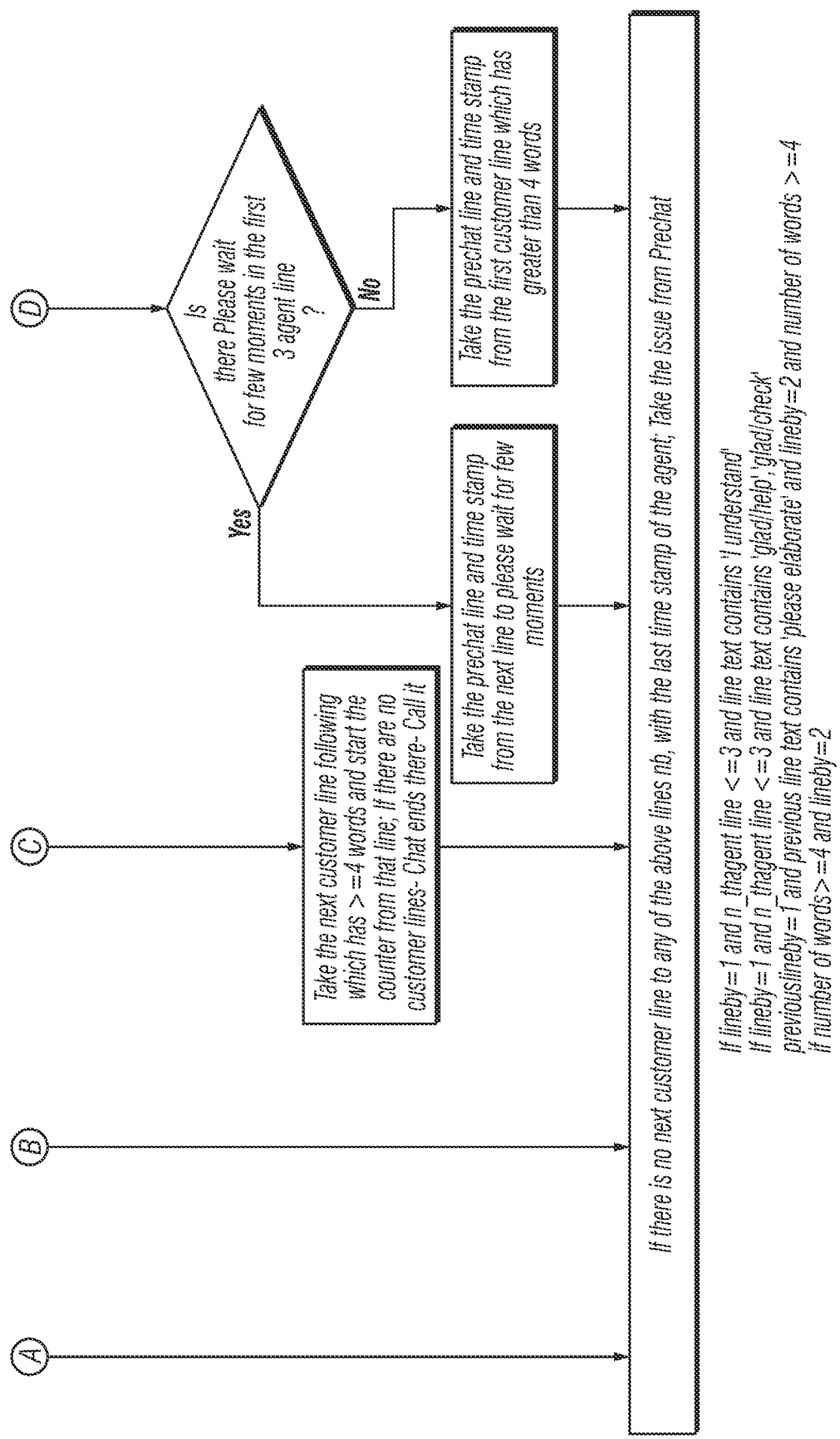
FIG. 9 is a flow diagram that shows an example of primary issue line identification according to the invention.
Figure 10:
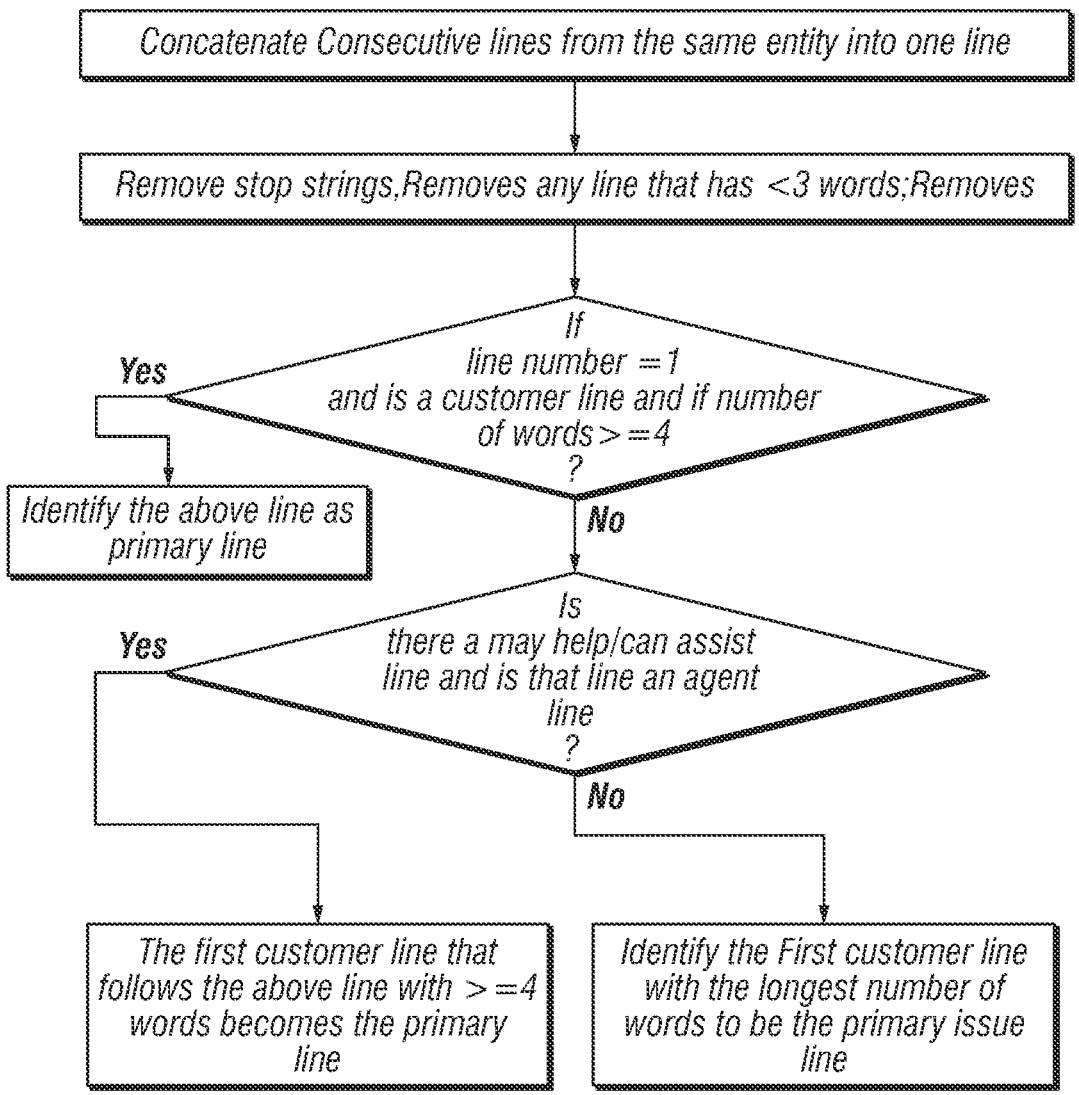
FIG. 10 is a flow diagram that shows a further example of primary issue line identification according to the invention.

The agent console operates in conjunction with a customer console 12 to establish a smart chat session that is guided by outputs 19 that include, for example, responses to FAQs that are generated based upon dynamic text mining, The system selects the right issue/issues being faced by the customer, matches them to FAQ responses to those issues and provides appropriate widgets for resolving these standard issues/questions. For example, if "Understanding Bill Details" is the key issue the customer is trying to resolve, the primary issue line identification algorithm shown in FIGS. 9 and 10 identifies the primary issue line. This line is text mined to identify the primary issue, in this case "Understanding Bill Details," and the widget that helps to explain the bill details is then deployed for customer interaction.

Figure 11:
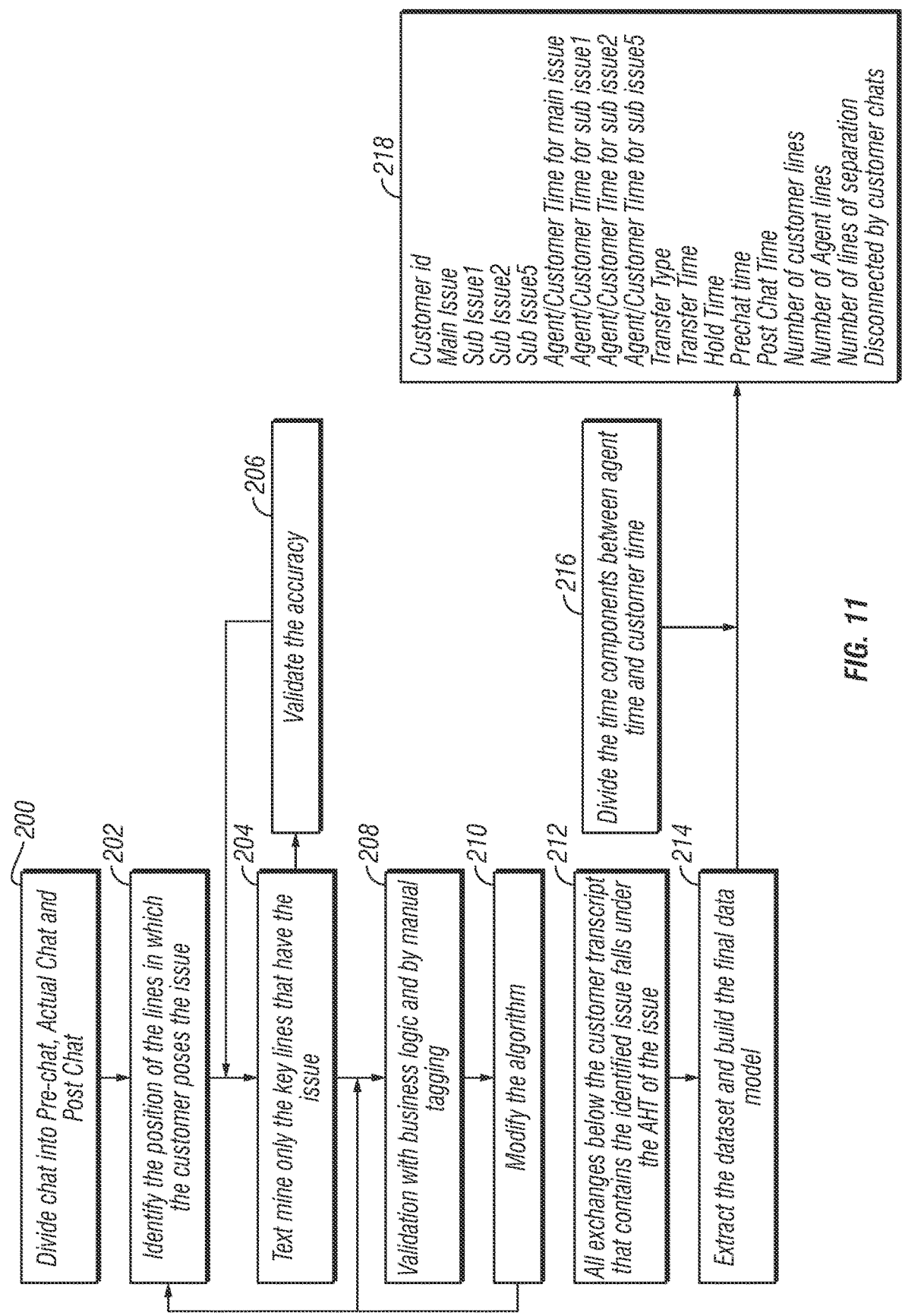
FIG. 11 is a flow diagram showing an average hold time (AHT) reduction algorithm according to the invention.

In FIG. 11, chat related information is divided into pre-chat, actual chat, and post chat (200). Pre-chat, actual chat, and post-chat are described below. Of these, all except pre-chat time add up to make the average handle time (AHT).

Pre-chat Time—Customer has accepted a chat invitation, but the chat has not started.

Pre-Issue Time—Customer has started chat, but is still in the greetings and customer statement of the issue.

Authentication Time—Customer gets authenticated by the agent before the agent starts issue resolution.

Issue Resolution Time—Time taken by the agent to resolve the issue.

Closure time—Time taken by the agent to close the chat after the issue has been resolved.

Wrap-up time—Time taken by the agent to do some after chat work, i.e. filling disposition forms regarding details of the chat and the customer.

Figure 12:
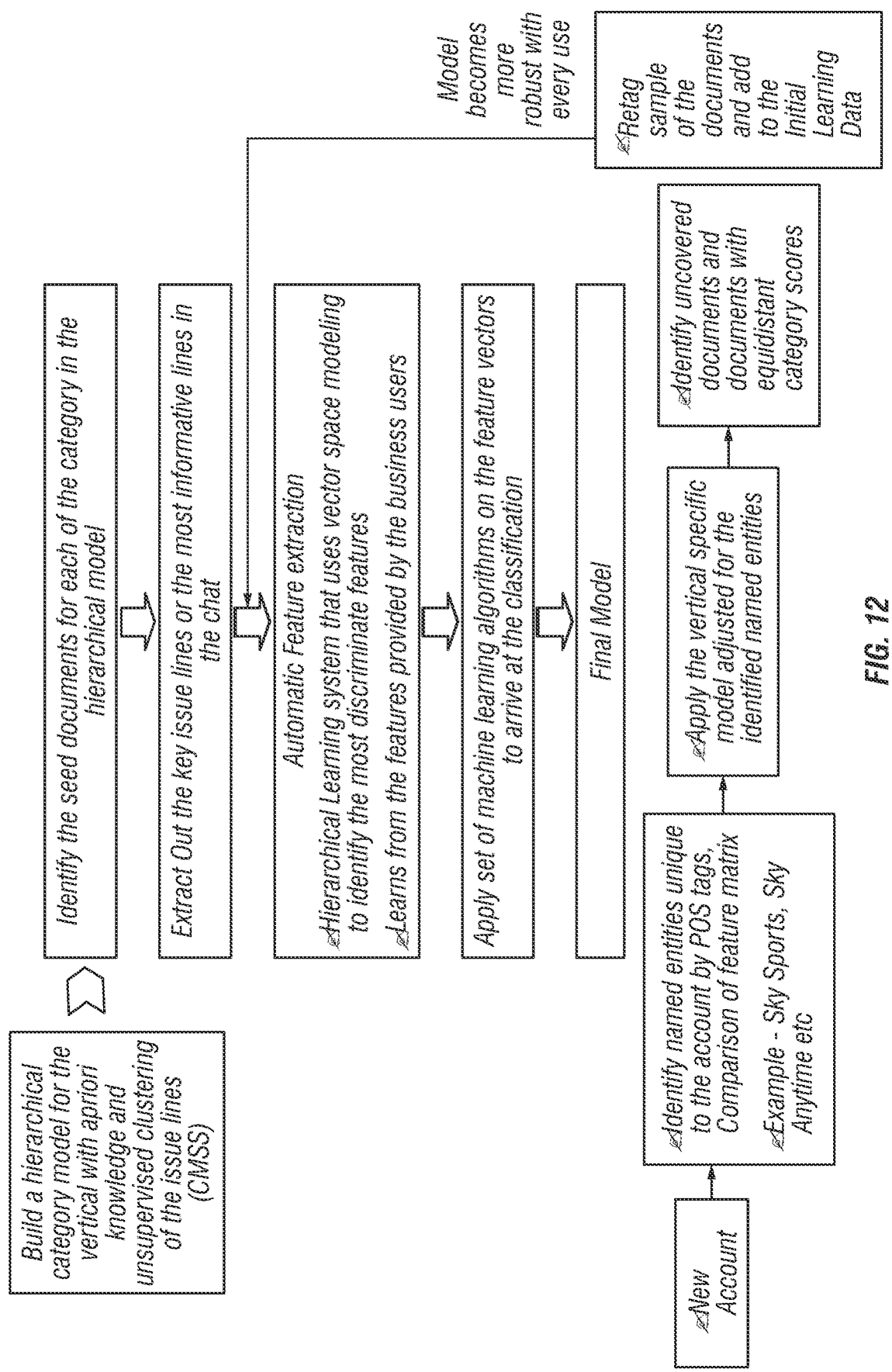
FIG. 12 is a flow diagram that shows an example of a text mining approach according to the invention.

Similarly, another key parameter that is tracked is average response time (ART) for the agent. Average response time is the average time taken by the agent to respond to a customer sentence. It is measured by the difference in timestamp between a customer query and an agent response. If the ART is high or the response time has a lot of variance, then this is a key driver of customer dissatisfaction The position in the chat transcript at which an issue is posed by the customer is identified (202). The system text mines the chat transcript for key lines that identify the issue (204). (See, also, FIG. 12, which is a flow diagram that shows an example of a text mining approach according to the invention.)

The model is developed using a supervised machine learning approach that learns from tagged data. The model is then used to classify new data. Thus, the data is initially tagged by human operators to build a model. Thereafter, the new data is applied to the model to produce a predicted output. The accuracy of the output first produced by the text mining operation is validated (206) and, once validation is acceptable, further validation is performed, for example by comparing against tagged data (208). As the system learns, the algorithm used for text mining with regard to the issue of concern is modified (210). Thereafter, the dataset is extracted and a final data model is built (214).

Once the final data model is built, new data is applied to the system. The system then divides the time components in the new data, i.e. pre-chat, actual chat, and post-chat, between agent time and customer time (216). A resulting dataset is produced (218) containing such information as, for example, customer ID, main issue, one or more sub-issues, agent/customer time for the main issue, agent/customer time for the sub-issues, transfer type, transfer time, hold time, pre-chat time, post-chat time, number of customer lines, number of agent lines, number of lines of separation, and status concerning disconnections by customer chats.

One aspect of the invention provides reporting for various experiments on the predictive service platform. For example, a software engine is provided that uses the customer's Web journey data, as well as CRM data, to target customers, evaluate their intent and the right time and mode of engagement to fulfill that intent. This embodiment also provides a program that can take decisions to engage with a customer in the customer's Web journey.

Figure 13B:
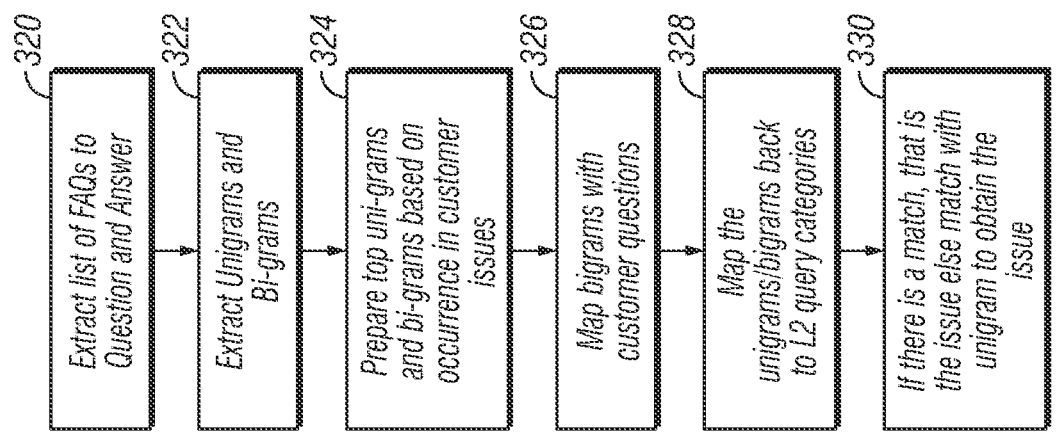
FIGS. 13a and 13b are a flow diagrams showing an algorithm for extraction of a primary question during a chat session (FIG. 13a) and extracting an issue (FIG. 13b) according to the invention.
Figure 13A:
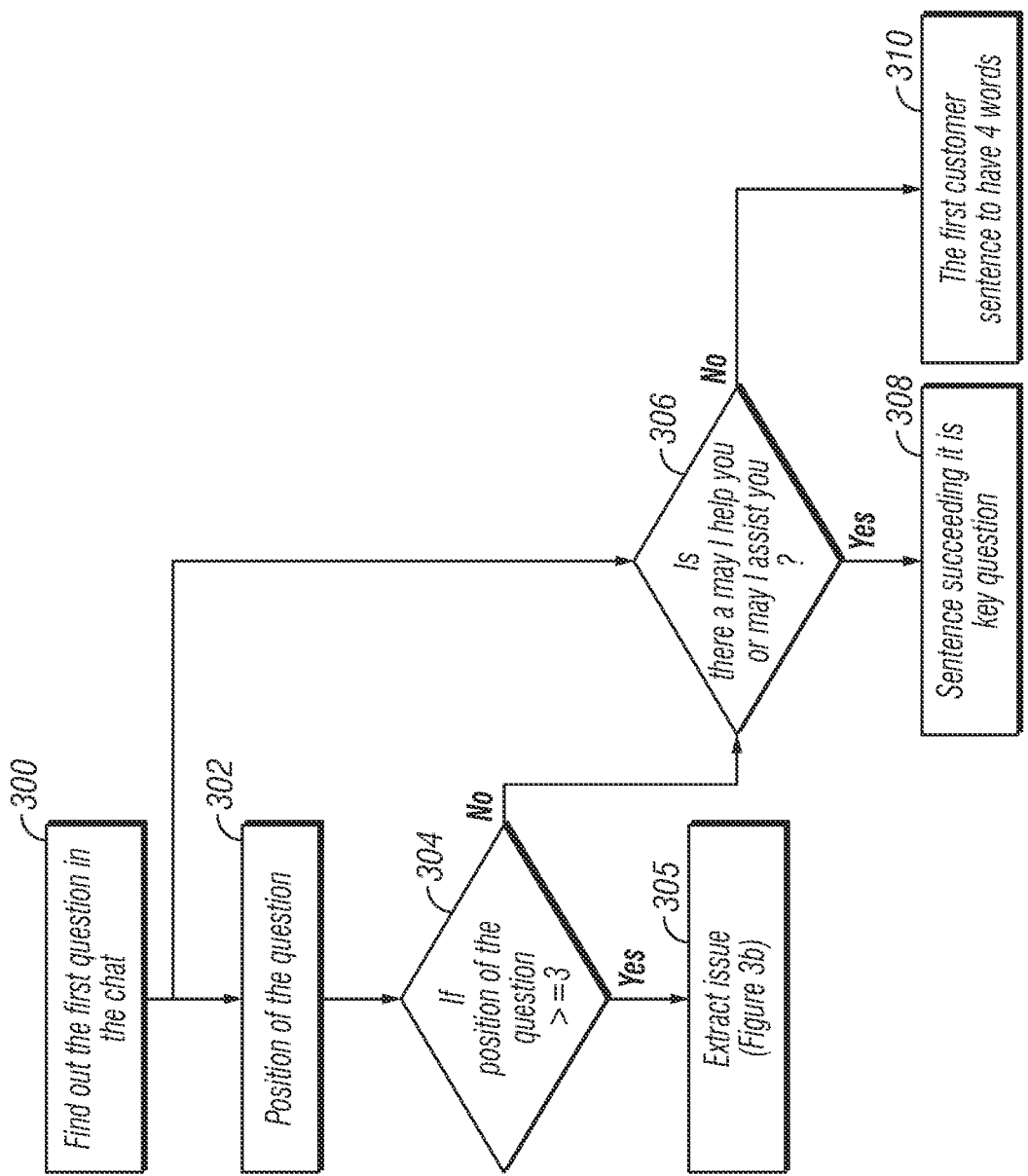

FIGS. 13a and 13b are a flow diagrams showing an algorithm for extraction of a primary question during a chat session (FIG. 13a) and extracting an issue (FIG. 13b) according to the invention.

In FIG. 13a, the first question in a chat session is identified (300). (See, also, FIGS. 9 and 10 which show two possible variations in a multitude of possible variations in identifying the primary issue line. These are all heuristic based approaches to identifying a primary line.)

The position of the question in the chat transcript is then identified (302). In the presently preferred embodiment of the invention, if the position of the question in the transcript is greater than or equal to three (306), then the issue is extracted (305); else, the transcript is analyzed to determine if a phrase such as "May I help you?" or "May I assist you?" is present (306). If such a phrase is found, then the next sentence is deemed to be the key question (308); else, the system identifies the first customer sentence in the transcript that has at least four words as the key question (310). Those skilled in the art will appreciate that the position of the sentence in the transcript, the phrases identified, and the number of words in the first customer sentence are a matter of choice when implementing the invention and that other values and variations on the steps set forth in connection with FIG. 13a may be used and are considered to be within the scope of the invention.

In FIG. 13b, the primary question has been located and the issue is then extracted. The system extracts a list of FAQs with regard to the question and having related answers (320). The system then extracts unigrams and bigrams from the question (322). An n-gram is a subsequence of n items from a given sequence. The items in question can be phonemes, syllables, letters, words, or base pairs according to the application. An n-gram of size 1 is referred to as a unigram; size 2 is a bigram; etc. An n-gram model is one type of probabilistic model that can be used in an embodiment of the invention for predicting the next item in a sequence. The n-grams are extracted using classic text mining techniques for feature extraction. A list of top unigrams and bigrams is prepared based upon their occurrence in customer issues (324) based on typical criteria used in text mining, such as TFIDF. See, for example, Sholom M Weiss, Nitin Indurkhya, Tong Zhang, Fred J. Damerau, *Text Mining—Predictive Methods for Analyzing Unstructured Information*, Springer Publications. The bigrams are mapped with customer issues (326) based on a probabilistic model, where the probability of a certain n-gram belonging to a certain issue category is determined based on features that have historically been seen in chats discussing that issue category. Such mapping of features to issue category is performed in one embodiment using manual tagging. The unigrams and bigrams are then mapped back to the query categories (328). If there is a match, then the issue has been successfully extracted; else, a match is made to the unigram to obtain the issue (330).

Problem Predictor

One embodiment provides a system that self-learns based on previous customer interactions and their performance metrics. For example, a program provides a templatized widget framework to enable an overlay widget, with rich content, on a client's Website to assist customers in a self-service mode.

FIG. 14 shows a sample progress table for a problem predictor according to the invention. In FIG. 14, variables evaluated include journey variables, source destination variables, chat time to departure/arrival time, code sharing or non-code sharing variables, time of day, and geography variables. See, also, FIGS. 7 and 8.

In a presently preferred embodiment of the invention, problem prediction is effected as a product of probabilities p for a question Q with regard to a plurality of answers A, as shown in Equation (1) below.

$$p(Q/A_1, \ldots, A_n) = p(Q)p(A1/Q)p(A2/Q) \ldots p(A_n/C) \quad (1)$$

This is a classic Naïve Bayes algorithm. Other algorithms that can predict the probability of the response variable, in this case an issue prediction, based on various customer attributes can be used and the invention is not limited to the use of a Naïve Bayes algorithm.

Rules Engine

One aspect of the invention provides plug-and-play support for various analytical algorithms and complex multivariate models in different implementations. Examples of such algorithms include Naïve Bayes, Logistic regression, Support Vector Machines, etc. There could be many other algorithms as well. Such system enables distributing condition evaluations across a client, i.e. browser, and server for optimizing performance. A database is provided that can hold multiple versions of complex rule configurations, and that can be taken live without any downtime.

Each published change of rule engine configuration is associated with a version specific to a client. Typically, the latest two versions are maintained to allow the possibility of switching back to a particular version at any point in time.

A particular version is marked as the active or default version (typically the latest one), and this version of the configuration is picked up for all visitors of the website. However, for experimentation and testing purposes, there is a possibility to map requests coming in from a set of IPs to a particular version or randomly select a version based on a probability distribution.

While configuring a new version, the new version becomes available for general use only when marked as the active version and any existing version is not impacted because of the change. In effect, there is no downtime incurred for the system because the publishing and switching of versions are done atomically. A published version can be checked for quality extensively before it is used in production, thereby improving the reliability of the system.

An aspect of this embodiment is a program that generates events during the lifecycle of a customer's session, and that allows other system components to subscribe for, and take appropriate actions.

Figure 15:
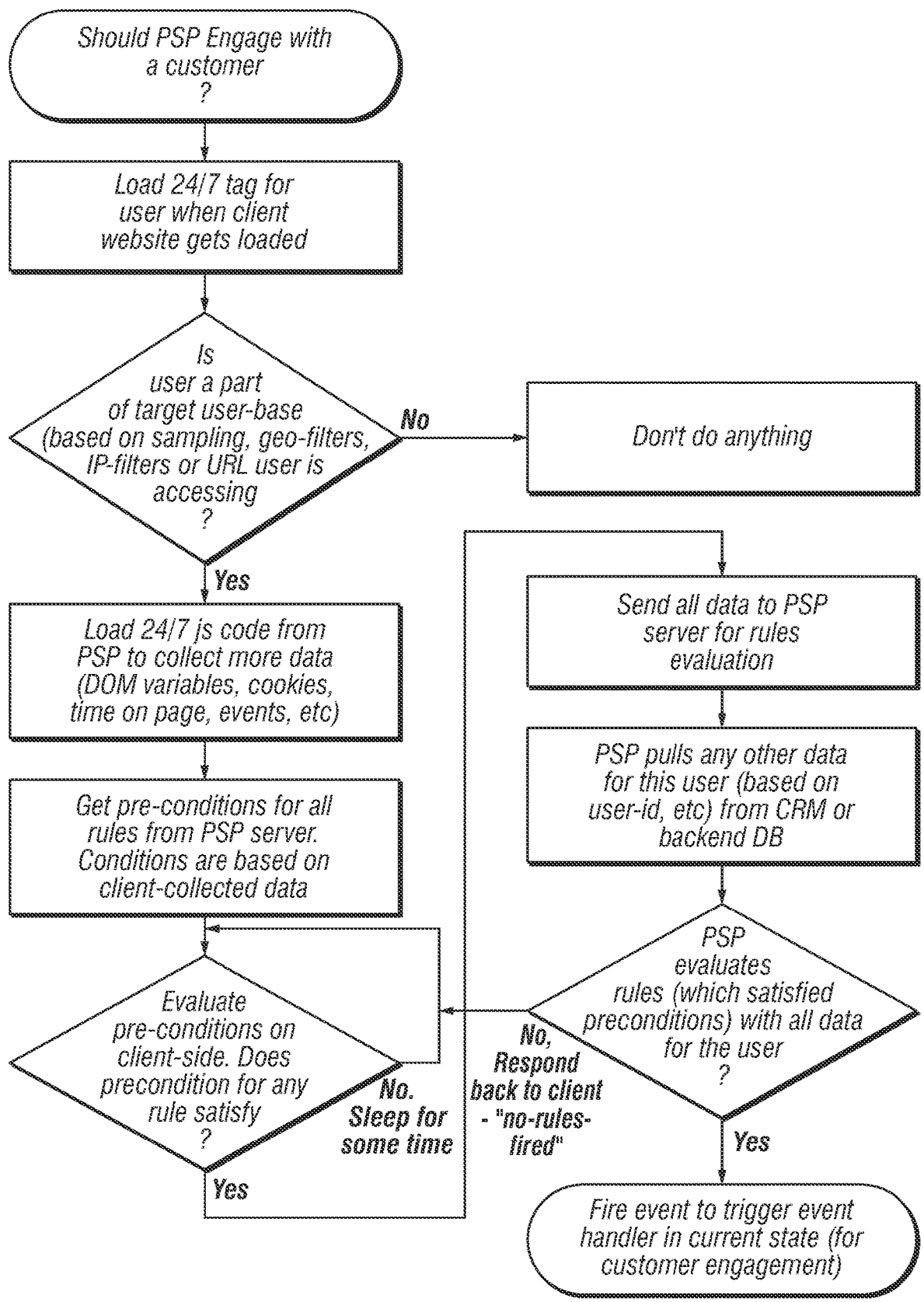
FIG. 15 is a flow diagram that shows a PSP process in the data collection and rule evaluation stages according to the invention.

FIG. 15 is a flow diagram that shows a PSP process in the data collection and rule evaluation stages according to the invention. Such system supports segmentation and experimentation to experiment on solutions for a best customer experience and includes, but is not limited to, performance of analytical models, as well as engagement experience, e.g. UI and interaction flow, with the customer data-driven decision making in a Web application, where a decision is based on client side data, as well as backend, data.

Key features of this embodiment of the invention include a rules engine that divides the entire decision making into three phases: client side data collection and client side condition evaluation; server side data collection from third party integrations (DB, CRM, etc.); and server side condition evaluation based on client, as well as server side, data.

Client side data includes, but is not limited to, time on a page, cookies, DOM data, HTML5 storage, and data obtained anywhere during a Web journey.

Server side data includes, but is not limited to, a page visitor's profile, past history and any third party data coming from a backend, for example, geographic information, weather information, etc.

Rules are defined in different contexts. For example, in a context, rules are inter-related in the following manner:
- One fired rule can suppress other rules for a configurable amount of time;
- One fired rule suppresses other rules for the lifetime of the visitor, expiry of which is configurable in the framework; and
- One fired rule can change other rules' priorities in specific context or for the lifetime of the visitor.

The rules engine can be added to any existing portal by including a simple script tag which loads the required JavaScript either at the bottom of the including page or in its head tag.

In an embodiment, some decision making is delegated on the client side to scale the decision making system. All the complex rules are hidden on the server side and can be managed by a configuration UI without any involvement of the portal owner on which rule engine is tagged.

Rules can be combined in a group for categorization and rule management. Rules can interact with each other in the system, such that the outcome of a rule can enable/disable certain other set of rules or suppress them for the given visitor for certain period of time or forever. Rules are evaluated on the server side on highly scalable servers and, hence, can be very complex based on multivariate models and scoring of different mathematical functions. Rules that are executed on the server can also take benefit of prediction algorithms to extrapolate outcomes given a set of parameters.

The rules engine supports multiple versions of the rules configuration and it is possible to maintain and push one of them live anytime from the configuration console. The rules engine decides on the target and control group based on criteria defined on the backend. It is possible to configure multiple control groups and test different rules on each of them. The rules engine can generate multiple events that other consumers can subscribe for further processing. FIG. 15 is a flow diagram that shows a PSP process in the data collection and rule evaluation stages according to the invention.

Client Storage

Today, all popular browsers support multiple tab or multiple window browsing and users do use multiple tabs to browse the Internet. It may happen that a user opens the same Website in multiple tabs at the same time. There is a possibility that a Website, when opened in a browser, needs to store data in user's computer storage to function properly. Thus, it is clear that a Website may need to store data on the user's machine and that, too, across multiple tabs or windows. Also, most of the popular browsers, such as Mozilla Firefox, Internet Explorer, and Safari, do not provide any synchronization construct for Websites to be able to access/write data in user's computer storage from multiple windows/tabs in a consistent and safe manner.

One feature of the invention provides a system that takes advantage of the persistent local storage on the browser to keep track of all the information through out the user's journey, thereby making the server stateless. In an embodiment, a program guides the customer through a resolution path on the Website using a step-by-step widget, that can track the exact state of the user. Such program can be a module or script that runs in browsers and provides synchronization construct for multiple tabs/browsers, thus opening up the same Website to access computer storage in a consistent manner using, for example, browser events and JavaScript.

Thus, this embodiment comprises a solution which provides any Website with a consistent and safe way to read and write to the user's computer storage from multiple tabs or windows. The implementation approach is generic and any Website can use it.

On a high level, the system achieves read/write synchronization on the user's computer storage by dividing the storage into different areas and using the browser's JavaScript events. There are algorithms which use JavaScript events generated by the browser and the storage itself to provide the above mentioned synchronization and a way to store the data into the user's computer storage from multiple windows and tabs.

The following events are examples of events that are used in the invention: focus event, blur event, mouse over event, unload event, and onload event. The system creates the following two logical storage areas to store all the data:
- Shared Storage area: which is common for the Website and for all tabs and windows and is accessed, read and write, from all the windows; and
- Window storage area: which every window has its own copy of. This area is also accessed, read only, from all the windows.

A locking mechanism is used to provide a given window the right to read or write into the shared storage area. Thus, at a given point of time, only the window that has this lock and can read/write into the shared storage area. The locking mechanism is implemented in this embodiment using a combination of focus, blur, and mouse over events generated by the browser; and lock information, including timestamp, that is maintained inside a window storage area of each window. The events, i.e. focus, blur, mouse over, are used to switch the lock from one window to another. The lock information stored in the window storage area determines which window currently has the lock. Also, the read access to the window storage area of all the windows from a given window is such that it ensures fault tolerance in the case of concurrent multiple reads and a single write.

Figure 16:
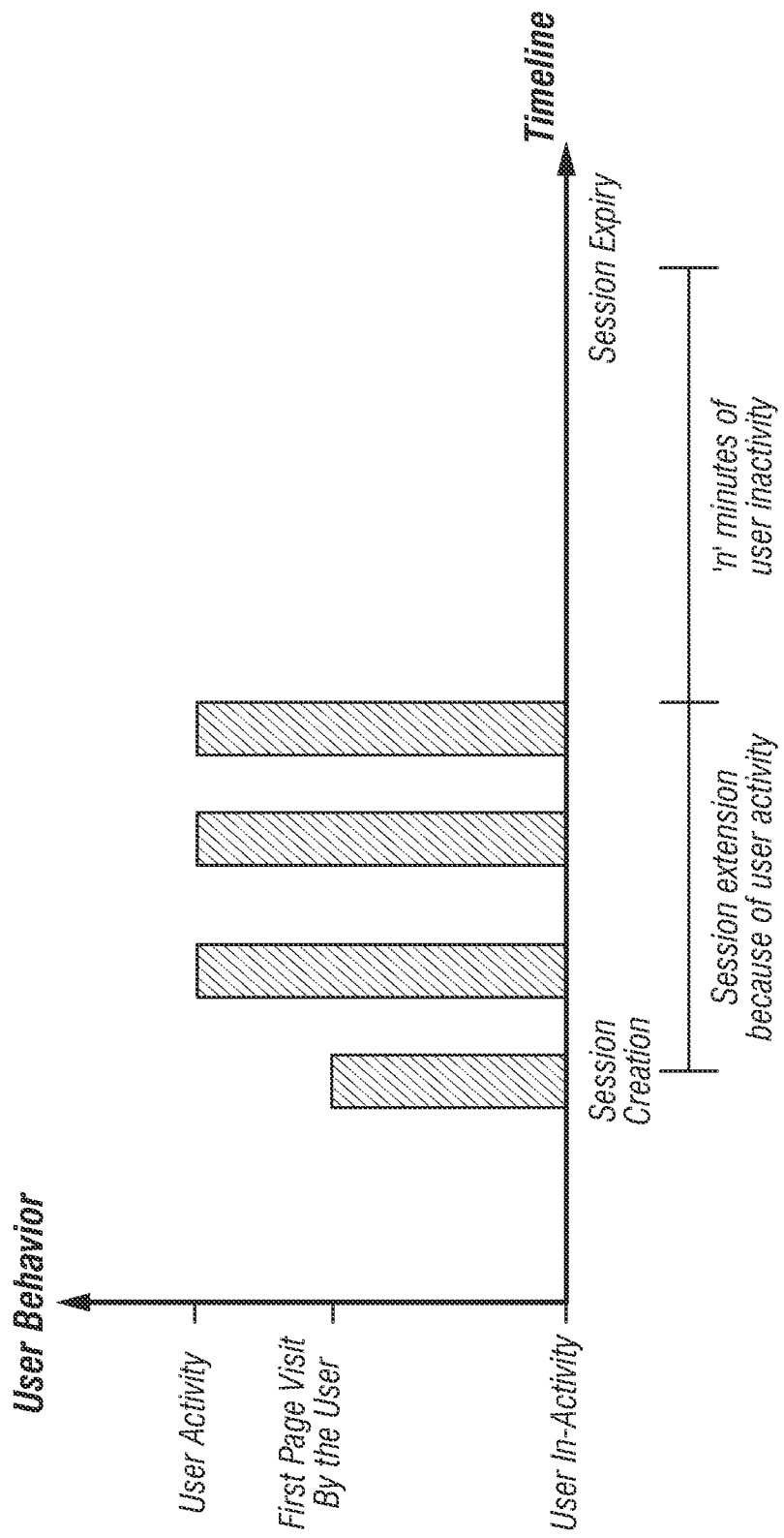
FIG. 16 is a timeline that shows a visitor session life cycle according to the invention.

FIG. 16 is a timeline that shows a visitor session life cycle according to the invention.

Figure 17:
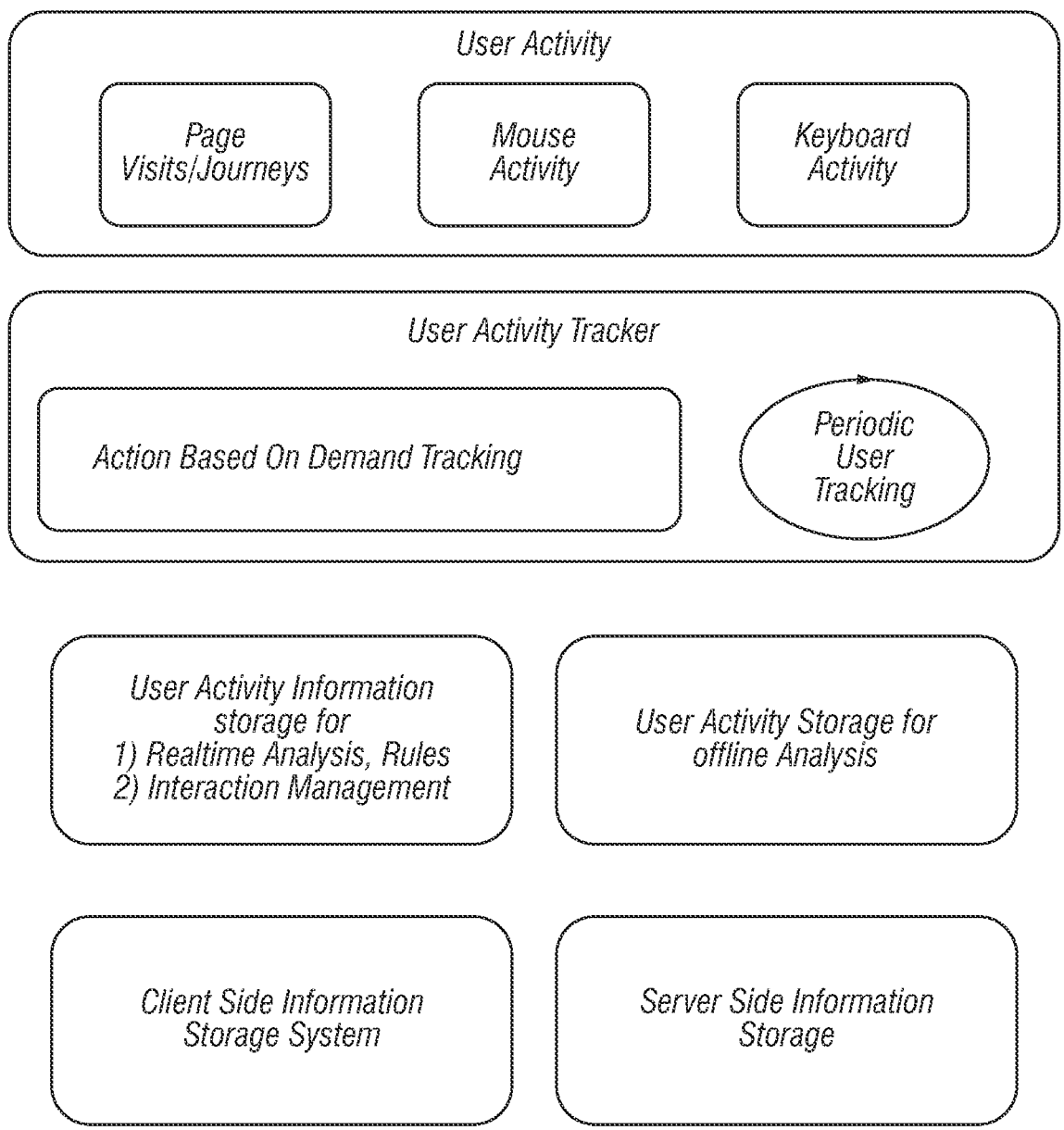
FIG. 17 is a block schematic diagram that shows periodic, on-demand user activity information tracking according to the invention.

FIG. 17 is a block schematic diagram that shows periodic, on-demand user activity information tracking according to the invention.

Figure 18:
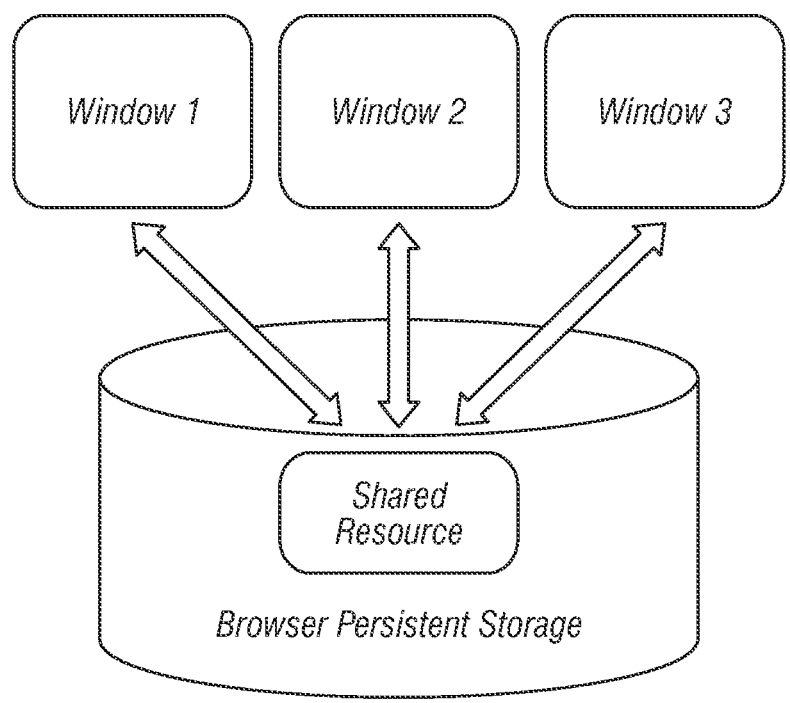
FIG. 18 is a block schematic diagram that shows the multiple tab window synchronization problem.

FIG. 18 is a block schematic diagram that shows the multiple tab window synchronization problem.

Figure 19:
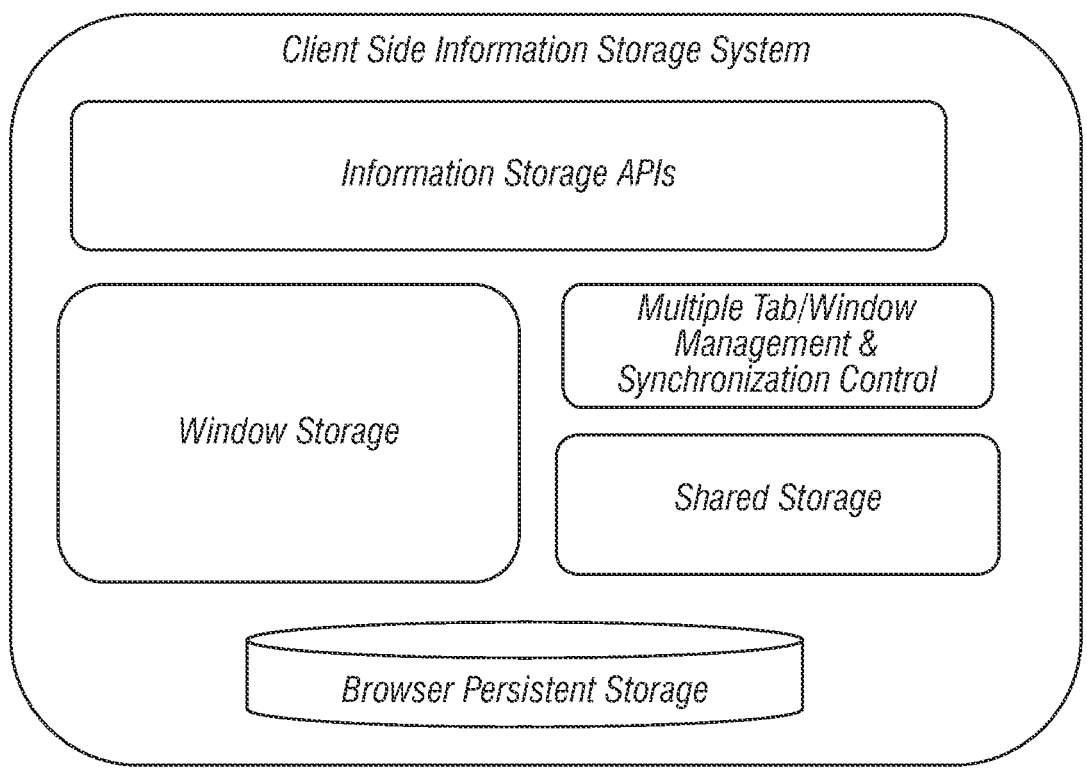
FIG. 19 is a block schematic diagram that shows a client side information storage system according to the invention.

FIG. 19 is a block schematic diagram that shows a client side information storage system according to the invention.

Figure 20:
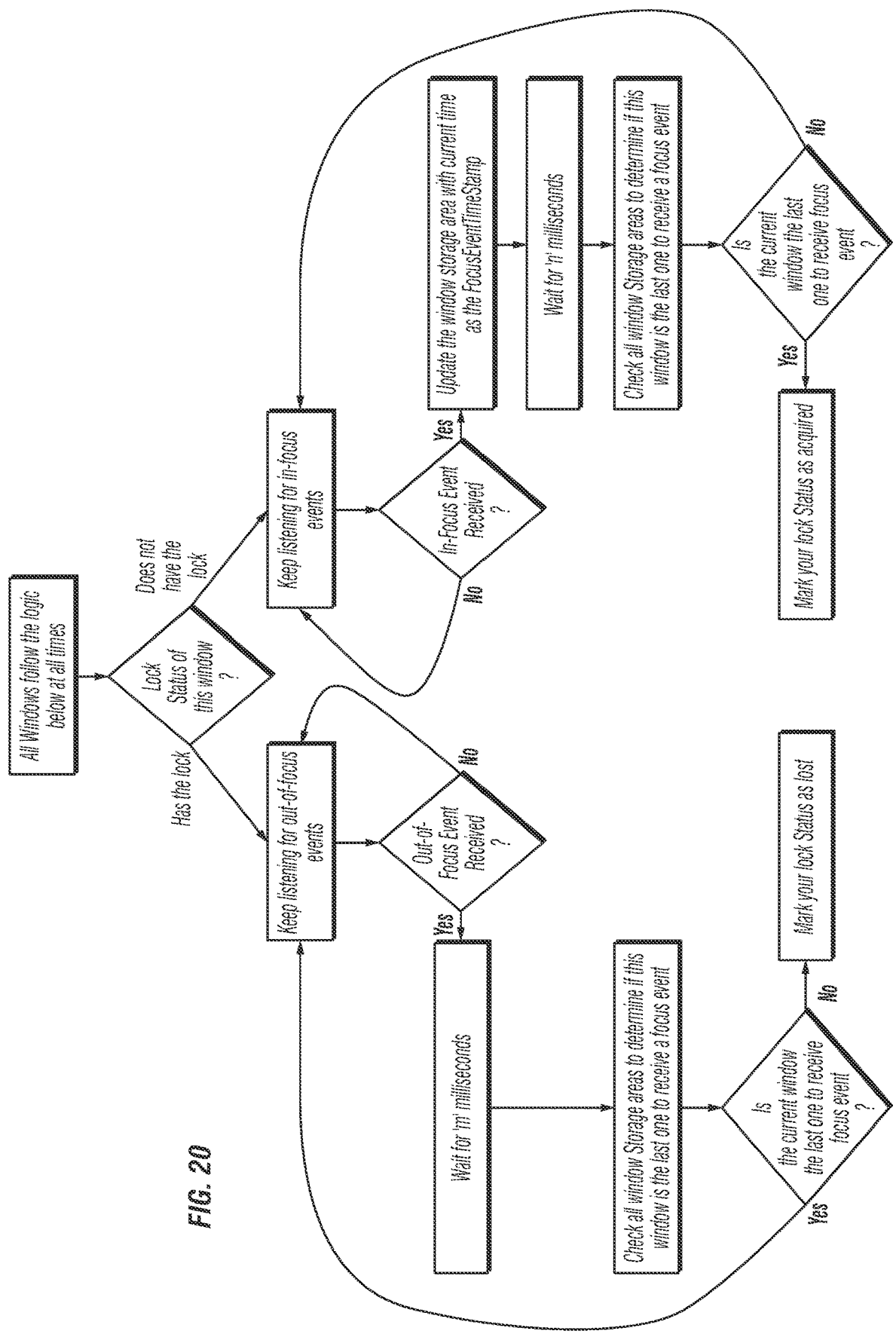
FIG. 20 is a flow diagram that shows a multiple tab synchronization algorithm according to the invention.

FIG. 20 is a flow diagram that shows a multiple tab synchronization algorithm according to the invention.

Experimentation Framework

An interaction system can be composed of several building blocks which together serve a common purpose, i.e. interact with the end user in the best possible manner.

These building blocks can be:
- "Rules" which trigger a new interaction flow or an action within the interaction.
- The channel of the interaction, for example Web, phone, self service, chat, voice, etc.
- The experience within a given channel.
- The seamless handling of an interaction across various channels.

To optimize these building blocks to achieve the best business outcomes, one needs to experiment with these building blocks and determine which configuration of these building blocks produces the optimum results in a real world environment. The optimization can be on any parameter or set of parameters, based on the business needs.

Here are a few example use cases:
1. The ability to evaluate different set of rules for different samples of visitors in real time. This experimentation can help figure out which set of rules performs the best.
2. The ability to take different actions whenever a rule triggers for different samples of visitors in real time. This experimentation can help figure out which action performs the best.
3. The ability to have different working, content, and look and feel of an action for different samples of visitors in real time. This again, can help figure out which content/working/look and feel leads to best results.

While experimentation is an utmost need in today's fast changing world, the cost of a failure in an experiment needs to be kept low. Experimentation should happen through a pre-configured system which can ensure predictability. Experimentation should be possible in real time and in the real world (live) environment. It should be possible to try out different configurations within any building block.

Experimentables

An experimentable is an entity that someone may like to experiment with. This means the same entity may have different values for different samples of users. The intention is to find out which value for that entity gives optimum results.

Examples:
Set of rules to be evaluated on website visitors. In this case, different sets of rules are evaluated for different samples of visitors to see which set works best.
Widget. In this case, different widgets can be shown to the different samples of users.
Widget experience. In this case, a different widget experience, including content, flow, color theme, etc. is shown to different samples of visitors.

Experimentable Values

There are various values an experimentable may take depending on the situation, these values are termed as experimentable values.

For example:
A "widgetColor" experimentable may take {Red, Green, Blue} values for different samples of visitors.
A "widgetWelcomeMessage" experimentable may take {"Hello", "Hi"} values for different samples of visitors.

Experimentable Rules

For the purpose of experimentation, every experimentable can be configured to have many different values. Which value should be applied for a given visitor can be dependent on various factors. Different values need to be applied under different situations.

To articulate the mapping of situations to set of values possible in that situation, the experimentation framework provides the concept of experimentable rules.

An experimentable rule is a situation under which a given set of experimentable values should be considered. These rules are totally flexible can be based on any number, kind of conditions. The variables used in these conditions again can come from any source, including an online real time parameter, an offline pre-configured parameter, and a derived parameter which is a combination of the above. These rules are evaluated in the configured order of priority. If a rule is satisfied, the rest of the (lower priority) rules are not evaluated.

For example:
Lets say we want to configure the experimentable—"WidgetColor".
We want one of {Red, Green, Blue} for the visitors which satisfy a situation 'x'.
And we want one of {violet, pink} for the visitors which satisfy the situation 'Y'
In such a case we should configure two experiment rules 'x' and 'y'.
'x' and 'y' should be composed of the conditions which define the situations 'x' and 'y' respectively.

Experimentable Value Selection Policy

Every experimentable rule points to a set of values which should be considered for a given visitor. The selection of the value within the considered set depends on a pre-configured policy. This is termed as experimentable value selection policy. Any policy can be applied to choose between the set of values.

For example:
Lets say we want to configure the experimentable—"WidgetColor".
We want one of {Red, Green, Blue} for the visitors which satisfy the experiment rule 'x'.
The selection policy could be as simple as "RoundRobin".
In such a case, Red, Green and blue will be selected in a round robin fashion.

Experimentation Tags

An experimentation tag is a string key which can have any one of a set of values. The selection of the experimentation tag value is done whenever the given tag is assigned to a new visitor. The experimentation tag value determines the sample into which this visitor falls into. Every user can be assigned multiple experimentation tags, and the selected value with each tag, during various stages of a session. The value of a given tag for a visitor is determined based on a random number sampling. Also, experimentation tags are persistent. This means that once an experiment tag is created it can be used across all experimentables for a given visitor.

Experimentation Tag Values:

An experimentation tag value is a string which helps in identifying a particular kind of output for a given experimentable.

For example:
WidgetTag: {VisitorsSampleForWidgets1, VisitorsSampleForWidgets2}. These are the two string values of the tag with the key 'WidgetTag'.
GeneralTag: {generalVisitorSample1, generalVisitorSample2, generalVisitorSample3}. These are the three possible string values of the tag with the key 'GeneralTag'.
Example Experimentation Tag Value Distributions:
WidgetTag: 10% visitors—VisitorsSampleForWidgets1, 90% visitors—VisitorsSampleForWidgets1.
Out of all the visitors which are assigned the 'widgetTag', 10% would have the value VisitorsSampleForWidgets1' and the rest would have the value VisitorsSampleForWidgets2'.
GeneralTag: 5% visitors generalVisitorSample1, 80% visitors—generalVisitorSample2, 15% visitors—generalVisitorSample3
Out of all the visitors which are assigned the 'GeneralTag', 5% would have the value 'generalVisitorSample1', 80% would have the value 'generalVisitorSample2 and the rest would have the value 'generalVisitorSample2'.
Given the above two tags, the visitors are sampled across two dimensions and 6(2×3) samples are created (see Table 1 below).

TABLE 1

|  | General Tag (5%) | General Tag (80%) | General Tag (15%) |
|---|---|---|---|
| WidgetTag (10) | sample 1-10% of 5% | sample 2-10% of 80% | sample 3-10% of 15% |
| WidgetTag (90) | sample 4-90% of 5% | sample 5-90% of 80% | sample 6-90% of 15% |

Table 2 below provides an example scenario where each visitor is assigned two experimentation tags and the values are assigned based on random number sampling.

TABLE 2

| Visitors | WidgetTag (Values below) | GeneralTag (Values below) |
|---|---|---|
| visitor1 - John | VisitorsSampleForWidgets1 | generalVisitorSample2 |
| visitor2 - Jane | VisitorsSampleForWidgets2 | generalVisitorSample1 |
| visitor3 - unidentified | VisitorsSampleForWidgets2 | generalVisitorSample3 |

Design

Figure 21:
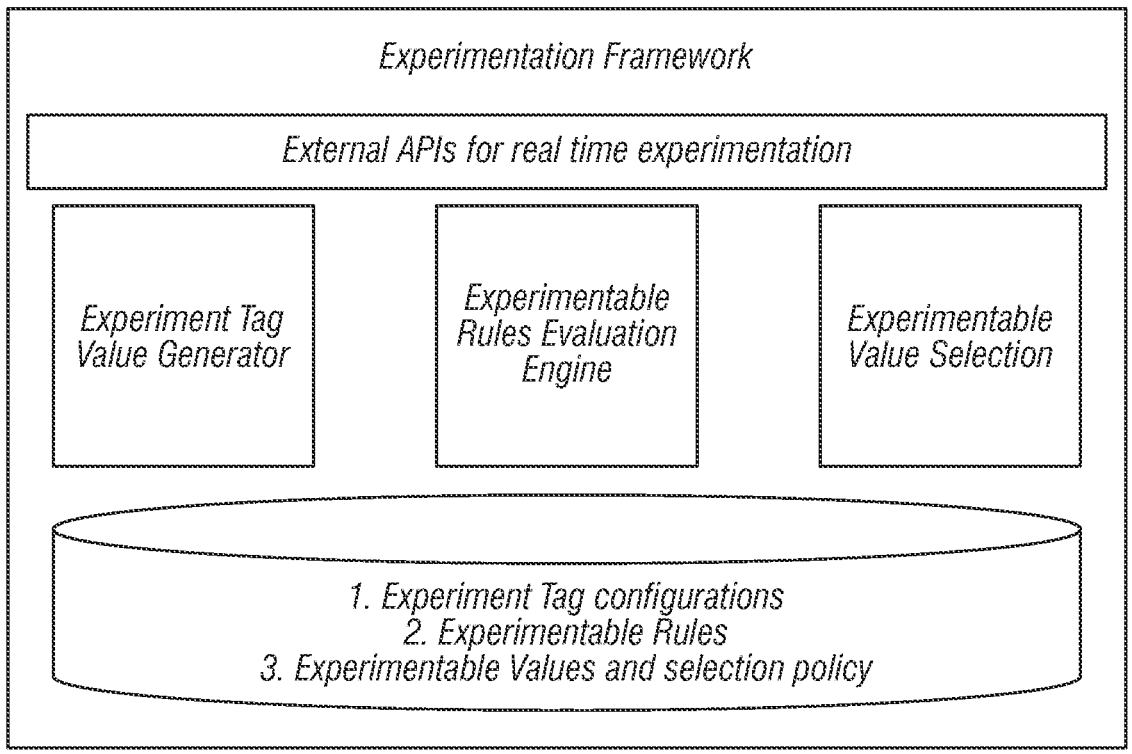
FIG. 21 is a block schematic diagram that shows a high level design of a real time experimentation framework according to the invention.

FIG. 21 is a block schematic diagram that shows a high level design of a real time experimentation framework according to the invention.

Figure 22:
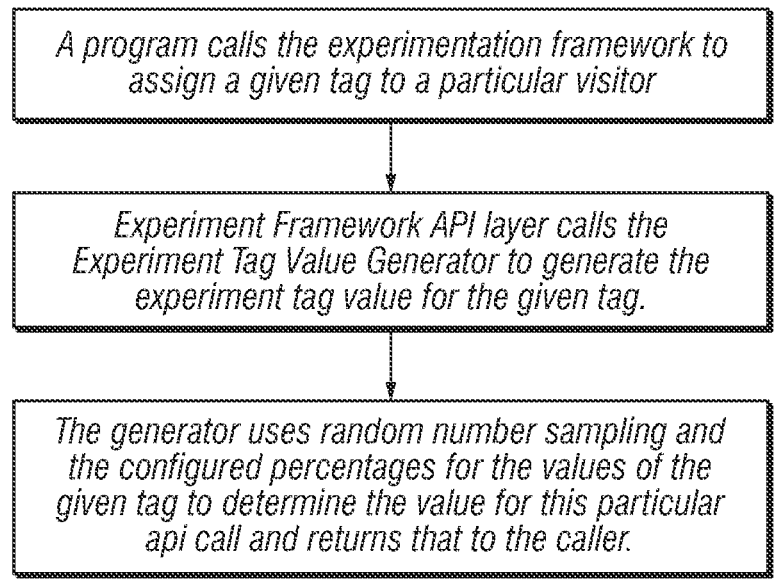
FIG. 22 is a flow diagram that show visitor tagging according to the invention.

FIG. 22 is a flow diagram that show visitor tagging according to the invention.

Figure 23:
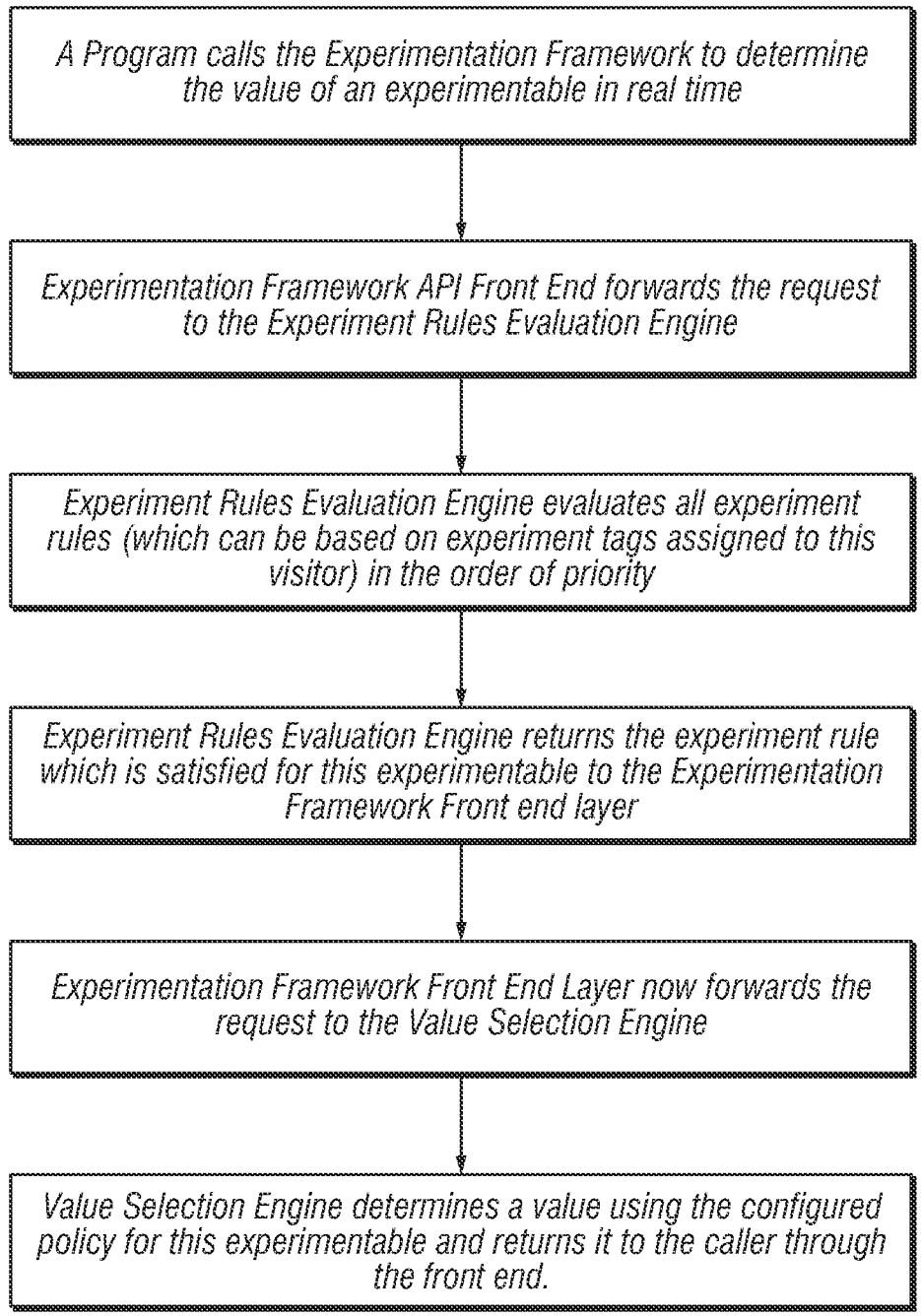
FIG. 23 is a flow diagram that shows real time experimentable value determination according to the invention.

FIG. 23 is a flow diagram that shows real time experimentable value determination according to the invention.

Features

1. The cost of a failure for experiment needs can be kept low by keeping the experiment tag value percentage configurations.
2. Experimentation happens through a pre-configured system, including experiment tags, rules, values, and the selection policy.
3. Experimentation is supported in real time and in the real world (live) environment. Every visitor's end-to-end experience can be experimented with given the above system.
4. It is possible to experiment the following building blocks of an interaction management system:
   a. The rules that should be evaluated on a given visitor.
   b. The engagement channel that should be selected for a given visitor.
   c. The engagement experience within the given channel.
5. Also, it is possible to create independent visitor samples at different stages of the interaction using experimentation tags.
6. An experimentation tag is persistent so that the same tag can be used across all the various experimentables for a given a visitor interaction experience.
7. Experimentable values can be chosen based on the following two constructs:
   a. Experimentable rules; and
   b. Value selection policy.
8. Every experimentable rule can be based on the following inputs parameters:
   a. An online real time parameter including system parameters, such as experiment tags, etc.; and including visitor parameters, such as Website variables, etc.;
   b. An offline pre-configured parameter; and
   c. A derived parameter which is a combination of the above.
9. Experimentable value selection is a based on a policy and can be configured separately.
10. Value selection policy is de-coupled from the experiment rule evaluation (situation determination).

Computer Implementation

Figure 24:
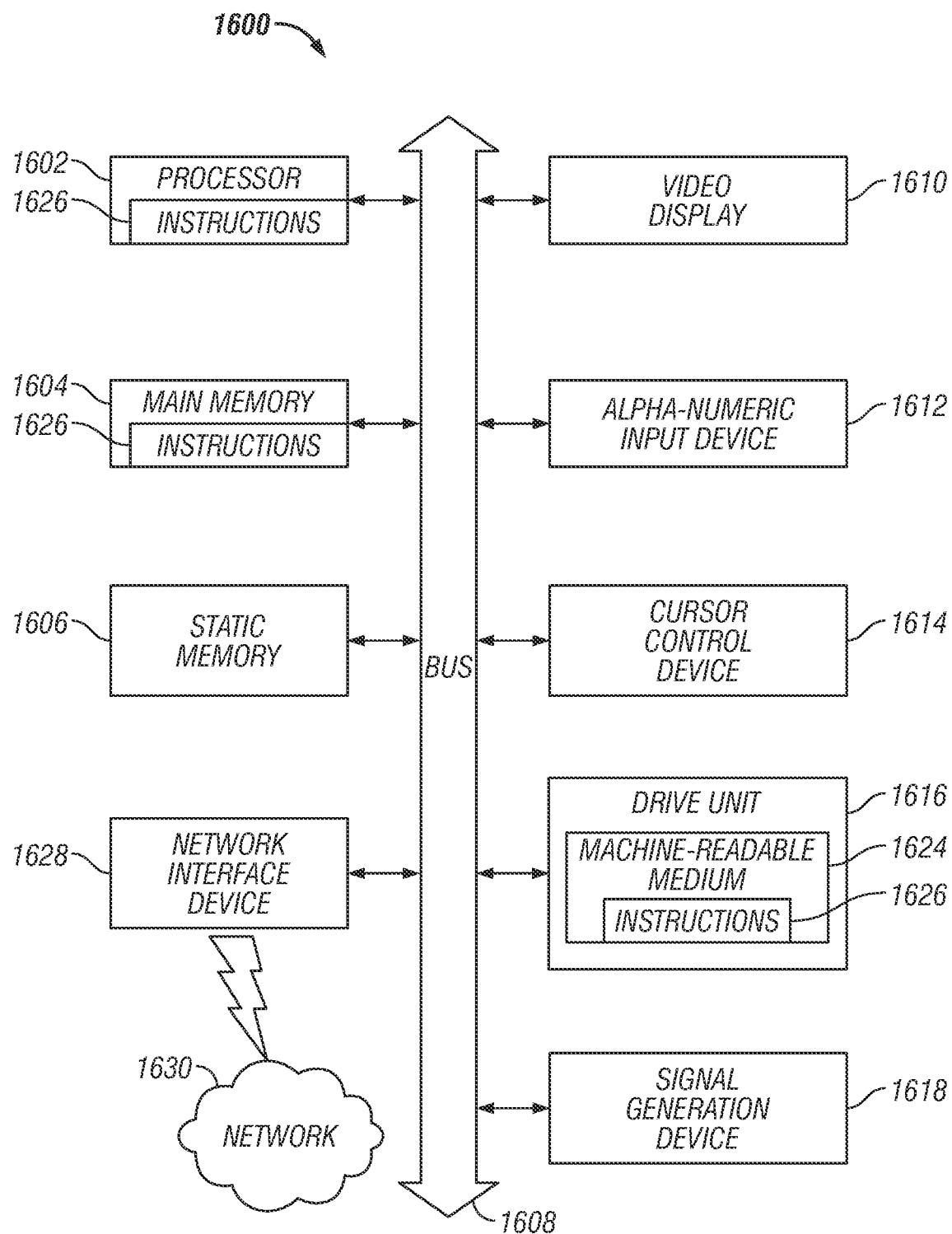
FIG. 24 is a block schematic diagram of a machine in the exemplary form of a computer system within which a set of instructions for causing the machine to perform any one of the herein disclosed methodologies may be executed.

FIG. 24 is a block schematic diagram of a machine in the exemplary form of a computer system 1600 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for event-driven, customizable action execution to facilitate contextual interactions, comprising:
   a processor and a memory configured as part of a predictive service platform for building and provisioning real time interaction management solutions over a network;
   said processor configured to capture information representative of a user's journey across said network, said journey representing said user's interactions with a website window of a browser associated with said network including any of data accessed on said website, actions performed on said website and time on pages of the website;
   said memory configured as a persistent local storage of said browser to store said information of said journey such that said information stored in said memory is capable of being shared locally across a plurality of windows of said browser;
   said processor configured to send updates of said stored information over a network to a server during non-persistent interactions to facilitate generation of a model of said journey as a finite state machine including distinct states and conditional transitions thereby making said server stateless, said model representing said user's interactions with the website, a chat transcript representing the user's prior interaction with the predictive service platform, and customer relationship management (CRM) records associated with said user, the model being a hierarchical category model generated using a machine learning algorithm;
   said processor configured to predict an issue of the user having a highest probability score identified in the model representing said user's interactions with the website, the chat transcript representing the user's prior interaction with the predictive service platform, and the CRM records associated with said user; and
   said processor performing a specific action correlating to the issue of the user as predicted using the model, the specific action causing a state transition or display of an interface representing an interaction opportunity to resolve said issue of said user.

2. The apparatus of claim 1, wherein the interactions with the website include a page loading results.

3. The apparatus of claim 1, wherein the interactions with the website includes any of data, actions, and time on all pages.

4. The apparatus of claim 1, wherein said interface includes any of:
   an interaction popup;
   a self-service wizard;
   a customized interaction interface to the user; and
   and a chat conversation.

5. The apparatus of claim 1, wherein the interactions with the website include any of chat, self-service, emails, social media, and click to call.

6. The apparatus of claim 1 further comprising:
   said processor configured to generate one or more sessions to identify any of a visitor, a logical browsing session of the user, and a logical interaction with the user.

7. The apparatus of claim 1, said processor configured to send periodical and on-demand update of tracked information to said server.

8. An apparatus for event-driven, customizable action execution to facilitate contextual interactions, comprising:
   a processor and a memory configured as part of a predictive service platform for building and provisioning real time interaction management solutions over a network;
   said processor configured to capture information stored in a persistent local storage of a client device, said stored information representative of a user's journey across said network, said journey representing said user's interactions with a website window of a browser associated with said network including any of data accessed on said website, actions performed on said website, and time on pages of the website;
   said processor configured to receive updates of said stored information over a network from said client device during non-persistent interactions to facilitate generation of a model of said journey as a finite state machine including distinct states and conditional transitions thereby making said apparatus stateless, said model representing said user's interactions with the website, a chat transcript representing the user's prior interaction with the predictive service platform, and customer relationship management (CRM) records associated with said user, the model generated using a machine learning algorithm;
   said processor configured to predict an issue of the user having a highest probability score identified in the model representing said user's interactions with the website, the chat transcript representing the user's prior interaction with the predictive service platform, and the CRM records associated with said user; and
   said processor causing the client device to perform a specific action correlating to said issue of the user as predicted using the model, the specific action including a state transition or display of an interface representing interaction opportunities to resolve said issue of said user during a lifecycle of said journey responsive to captured information.

9. The apparatus of claim 8, wherein said apparatus is a server comprising:
   a rules engine configured to divide decision making into three phases to predict said issue, comprising:
      client side data collection and client side condition evaluation;
      server side data collection from third party integrations; and
      server side condition evaluation based on client, as well as server side, data.

10. The apparatus of claim 8, said processor configured to allow other system components to subscribe for, and take appropriate actions.

11. The apparatus of claim 9, wherein client side data comprises any of:
    time on a page;
    geography;
    cookies;
    DOM data;
    client side persistent storage; and
    data obtained anywhere during a journey.

12. The apparatus of claim 9, wherein server side data comprises any of:
    a page visitor's profile; and
    past history and any third party data coming from a backend.

13. The apparatus of claim 1, wherein the issue of the user is predicted by identifying a query type having the highest probability score in a probability matrix associated with the hierarchical category model.

14. The apparatus of claim 8, wherein the issue of the user is predicted by identifying a query type having the highest probability score in a probability matrix associated with the model.

* * * * *